April 13, 1965 E. HONORE ETAL 3,178,565

COMPUTER SYSTEMS FOR SOLVING SIMULTANEOUS EQUATIONS

Filed March 29, 1961 15 Sheets-Sheet 4

April 13, 1965 E. HONORE ETAL 3,178,565

COMPUTER SYSTEMS FOR SOLVING SIMULTANEOUS EQUATIONS

Filed March 29, 1961 15 Sheets-Sheet 6

April 13, 1965 E. HONORE ETAL 3,178,565

COMPUTER SYSTEMS FOR SOLVING SIMULTANEOUS EQUATIONS

Filed March 29, 1961 15 Sheets-Sheet 8

April 13, 1965 E. HONORE ETAL 3,178,565

COMPUTER SYSTEMS FOR SOLVING SIMULTANEOUS EQUATIONS

Filed March 29, 1961 15 Sheets-Sheet 10

COMPUTER SYSTEMS FOR SOLVING SIMULTANEOUS EQUATIONS

Filed March 29, 1961 15 Sheets-Sheet 14

United States Patent Office 3,178,565

Patented Apr. 13, 1965

3,178,565

COMPUTER SYSTEMS FOR SOLVING SIMULTANEOUS EQUATIONS

Etienne Honore and Emile Torcheux, Paris, France, assignors to Compagnie Generale de Telegraphie Sans Fil, a corporation of France, and Societe Marocaine de Recherches, d'Etudes et de Developpements Somarede, a corporation of Morocco Filed Mar. 29, 1961, Ser. No. 99,123
Claims priority, application France, Apr. 8, 1960, 823,797
15 Claims. (Cl. 235—180)

The present invention relates to analog computers more particularly of the type adapted to solve equation systems such as, $$f_1(x_1 \ldots x_q)=0$$

$$* \quad * \quad * \quad * \quad *$$

$$f_p(x_1 \ldots x_q)=0$$

where $p$ is the number of the equations and $q$ the number of the unknowns.

Computer arrangements of this type generally comprise:

(*a*) Devices for respectively simulating the instantaneous values of the unknowns $x_1$ to $x_q$. Such devices, which will be hereinafter termed "Generators" since they generate values of the unknowns, are mostly amplifiers, servo-mechanisms or integrators.

(*b*) An Error Calculator assembly which receives the respective output magnitudes of the generators and which provides $p$ electrical magnitudes, voltages or currents, respectively simulating the values assumed by functions $f_1$ to $f_p$ for the instantaneous values of unknowns $x_1 \ldots x_q$ fed thereto.

These magnitudes, which are, in fact, error values, for example error voltages, are applied directly to the inputs of the generators, and it is then up to the operator to arrange the feedback loop in order to select the generator to which a given error magnitude must be applied. The output magnitudes of the generators are thus caused to vary until error magnitudes are made equal to zero, the values generated by the generators being then the respective roots of the equation system considered. However, this type of computer has inherent disadvantages. In particular, the selection of the loops is all the more difficult as the number $p$ of equations is greater.

In order to overcome this difficulty, it is known to place in the feedback loop of the computer systems of the above outlined type an additional device, which, in so far as this invention is concerned, will be designated as a "Switcher." This unit, has $p$ inputs, for receiving respectively from the $p$ outputs of the Error Calculator the $p$ error signals $f_1 \ldots f_p$, and $q$ outputs, for providing $q$ control voltages $U_1 \ldots U_q$ which respectively control the operation of the generators. It performs the function of switching the error signals received from the calculator system in such a manner as to provide the output voltages individually controlling the generators. In such systems, the problem of loop selection no longer exists. Moreover, such systems may be used for solving systems of equations where the number $p$ of equations is higher than the number $q$ of unknowns. In this case, the assembly will deliver a solution which is a compromise between the various conditions assigned.

The known switching devices of this type present, however, serious drawbacks. Among others is the fact that the gain of the feedback loop of the generators is not constant, but depends on the equation system to be solved. If the gain is too high, the operation is unstable and, if it is too low, the operation is inaccurate and slow.

The invention has for its object to provide a Switcher for the computer systems of the above outlined type wherein these difficulties are avoided.

The invention will be described with reference to the appended drawings, wherein.

Similar reference characters will be used to designate similar elements throughout all the figures.

While the physical structure of the circuits to be described is believed to be clearly set forth hereinafter, the theory behind these circuits, which is set forth to the best of the applicants' knowledge and understanding, might perhaps appear to be not entirely satisfactory. However this may be, the operation of the system according to the invention is clearly set forth and does not depend on any purely theoretical explanation. In addition, the system has been tested and operates to the full satisfaction of the applicants.

Figure 1:
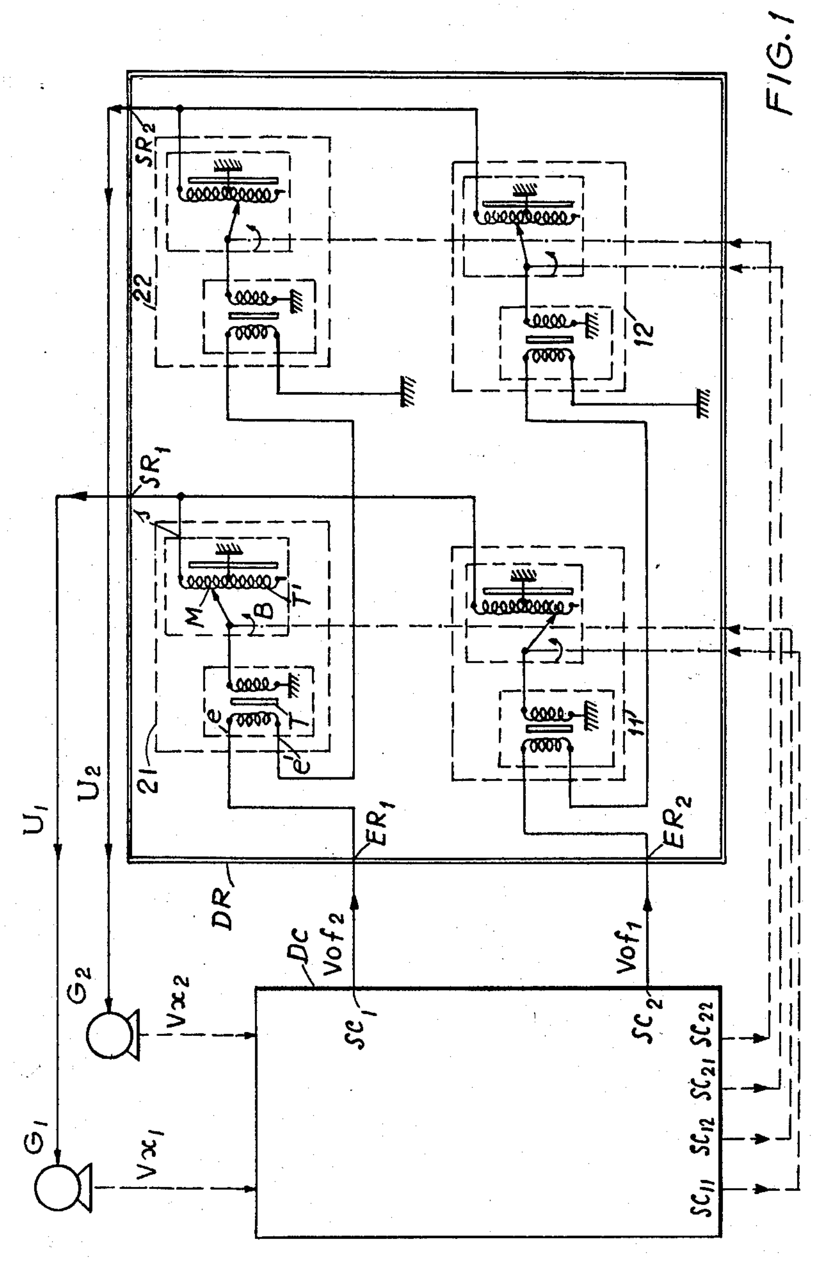
FIG. 1 illustrates, by way of example, a first embodiment of a switcher according to the invention.

FIG. 1 diagrammatically shows a computer system including a switcher according to the invention. This assembly is for solving the following set of equations:

$$f_1(x_1, x_2)=0 \quad (1)$$

$$f_2(x_1, x_2)=0$$

Hereinafter, it will be assumed that, in each instance, the usual calibration operations have been effected, i.e. the variation limits of $x_1$ and $x_2$ have first been adjusted to have:

$$-1<x_1<1 \quad (2)$$

$$-1<X_2<1$$

In a similar way, functions $f_1(x_1, x_2)$ and $f_2(x_1, x_2)$ have been adjusted, so that:

$$-1<f_i<1 \quad (3)$$

$$-1<\frac{\delta f_i}{\delta x_j}<1 \quad (4)$$

$i$ and $j$ representing indifferently 1 or 2.

Such operations are, as known, currently effected in computing techniques.

Let, for example, the following set of equations be considered:

$$f_1 \equiv X_1^2+X_2^2-4=0$$

$$f_2 \equiv X_1X_2-2=0$$

It is readily seen that the solution of this set of equations includes at least one value of $X_1$ or $X_2$, which is greater than 1. It will therefore be necessary to substitute $x_1$ for $X_1$ and $x_2$ for $X_2$, with $$x_1=\frac{X_1}{2} \text{ and } x_2=\frac{X_2}{2}$$

The set of equations will thus become:

$$x_1^2+x_2^2-1=0$$

$$x_1x_2-\frac{1}{2}=0$$

and accordingly, $$\frac{\delta f_1}{\delta x_1}=2x_1 \text{ and } \frac{\delta f_2}{\delta x_1}=x_2$$

$$\frac{\delta f_1}{\delta x_2}=2x_2 \text{ and } \frac{\delta f_2}{\delta x_2}=x_1$$

For $x_1=x_2=1$, the partial derivatives of $f_1$ are greater than 1. Accordingly the system will have to be written in a modified form:

$$f_1=(x_1^2+x_2^2)/2-\frac{1}{2}=0$$

$$f_2=x_1x_2-\frac{1}{2}=0$$

The system can now be written into the computer.

The computer system shown in FIG. 1 comprises two "generators" $G_1$ and $G_2$, the output shafts of which provide mechanical magnitudes proportional to $x_1$ and $x_2$. For example, a variation of $\pm$ a quarter of a turn in the angular position of these shafts corresponds to a variation of the variables $x_1$ and $x_2$ from $-1$ to $+1$.

Generators $G_1$ and $G_2$ have control inputs to which control voltages $U_1$ and $U_2$ are applied. Their output shafts are at rest when $U_1$ and $U_2$ are zero, and, in the opposite case, the output shafts rotate with a speed substantially proportional to these voltages and in a direction such that the control voltage decreases. For example, this speed may be of a quater of a turn per second for a control voltage of one volt.

Generators $G_1$ and $G_2$ feed magnitudes $x_1$ and $x_2$ to Error Calculator DC which is of the analogue type and delivers, at its outputs $SC_1$ and $SC_2$, voltages $V_1$ and $V_2$ which simulate the values of functions $f_1$ and $f_2$ for the values of $x_1$ and $x_2$ simulated by the respective positions of the output shafts of generators $G_1$ and $G_2$, so that $$V_1=V_0f_1(x_1, x_2) \qquad (5)$$
$$V_2=V_0f_2(x_1, x_2)$$

$V_0$ being a reference voltage, for example an alternating voltage of 400 c./s., equal to 100 v.

The Error Calculator DC also comprises output shafts $SC_{11}$, $SC_{12}$, $SC_{21}$ and $SC_{22}$ which provide mechanical magnitudes respectively proportional to the partial derivatives whose order is indicated by the subscript of the above reference letters. This may be obtained, for example, by translating into mechanical magnitudes the voltages values provided by the Error Calculator DC.

It should be noted that generators $G_1$ and $G_2$ and the Calculator DC are known per se and need therefore not be described in more detail. This error calculator DC may, for example, be of the type described in the U.S. Patent 2,914,250 issued on an application filed by the applicants and assigned to the same assignee.

In this patent, a computer is described, which receives an input voltage, $V_e$, and furnishes on output voltage $V_s$, $V_s$ and $V_e$ being connected by the equation $$V_s=V_ef(x_1 \ldots x_n)$$

$x_1 \ldots x_n$ being, for example, the respective angular positions of mechanical shafts. Such a computer is also capable of furnishing voltage $$V_s=V_e\frac{\delta f_i}{\delta x_p}$$

Any known servosystem may be associated with Calculator DC to receive therefrom an output voltage and translate the same into the position of a mechanical member, for example into the angular position of a shaft.

Outputs $SC_1$ and $SC_2$ of the Error Calculator DC are coupled to inputs $ER_1$ and $ER_2$ of Switcher DR provided by the invention. It comprises in the embodiment, shown in FIG. 1, four quadripoles 11, 12, 21 and 22, having the same structure.

Quadripoles 11 and 12 have their terminals $e$ and $e'$, which will be hereinafter termed "secondary terminals", connected in series between input $ER_2$ of the Switcher and ground. In a similar manner, quadripoles 21 and 22 have their secondary terminals connected in series between input $ER_1$ and ground.

Quadripoles 11 and 21 have their primary terminals connected in parallel between ground and output $SR_1$; quadripoles 12 and 22 have their primary terminals connected in parallel between ground and output $SR_2$.

Each of these quadripoles comprises, connected between its secondary terminals $e$ and $e'$, the secondary winding of a transformer T, the transformation ratio of which is equal to 1. The primary winding of transformer T is mounted between ground and the movable contact M of an auto-transformer T', the midpoint of which is grounded and one of the terminals of which is the primary terminal $s$ of the quadripole. The other primary terminal is grounded.

The movable contact M of a quadripole $ij$ is carried by a shaft B, the position of which is controlled by the corresponding output SC$ij$ of the Error Calculator DC.

It will be assumed that all the transformers are perfect transformers that, i.e. their ohmic losses are nil.

It may be readily seen that, upon application of a voltage $U_{ij}$ between the primary terminals of a quadripole $ij$ and ground, voltage $V_{ij}$ will appear at the secondary terminals $e$ and $e'$ with $$V_{ij}=N_{ij}.U_{ij} \qquad (6)$$

$N_{ij}$ being the transfer coefficient of quadripole $ij$ and depending on the position of contact M. It varies from $-1$, with M at the end opposite to end $s$, to $+1$, with M at terminal $s$.

Conversely, if a voltage $V_{ij}$ is applied to the secondary terminals of the same quadripole, a voltage $U_{ij}$ will appear at its primary input terminals, with $$U_{ij}=V_{ij}/N_{ij} \qquad (6')$$

Since the position of M varies as a function of $$\frac{\delta f_i}{\delta x_j}$$

the value of $N_{ij}$ may be readily adjusted to have $$N_{ij}=\frac{\delta f_i}{\delta x_j} \qquad (7)$$

In explaining the operation of the assembly, it will be assumed that the system $$f_1(x_1, x_2)=0$$

$$f_2(x_1, x_2)=0$$

is solved for $x_1=x_{10}$ *and* $x_2=x_{20}$. In this case, the magnitudes supplied by generators $G_1$ and $G_2$ are $x_{10}$ and $x_{20}$ and the voltages appearing at inputs $ER_1$ and $ER_2$ are zero. Accordingly, the control voltages $U_1$ and $U_2$ are nil and the whole of the system is in a state of balance.

In order to see whether this state of balance is stable, the case will be considered when the output shafts of generators $G_1$ and $G_2$ slightly depart from this balance position and provide magnitudes:

$$x_1=x_{10}+dx_1$$
$$x_2=x_{20}+dx_2$$

where $dx_1$ and $dx_2$ are small with respect to $+1$ and $-1$. Consequently, since $f_1$ and $f_2$ are very small, one may write:

$$f_1=df_1=\frac{\delta f_1}{\delta x_1}dx_1+\frac{\delta f_1}{\delta x_2}dx_2$$

and $$f_2=df_2=\frac{\delta f_2}{\delta x_1}dx_1+\frac{\delta f_2}{\delta x_2}dx_2$$

Now, if $U_1$ and $U_2$ are the voltages appearing at the outputs of the Switcher, i.e. respectively, at the primary terminals of quadripoles 11, 12 and 21, 22, the voltages appearing at the secondary terminals of these quadripoles will be, taking into account Equation 6:

$$V_{ij}=U_j\frac{\delta f_1}{\delta x_j}$$

Since the secondary terminals of quadripoles 11 and 12, on the one hand, and quadripoles 21 and 22, on the other hand, are connected in series, $$U_1\frac{\delta f_1}{\delta x_1}+U_2\frac{\delta f_1}{\delta x_2}=V_0df_1=V_0\left(\frac{\delta f_1}{\delta x_1}dx_1+\frac{\delta f_1}{\delta x_2}dx_2\right) \quad (7')$$

A similar equation is true for $f_2$.

Consequently:

$$U_1=V_0.dx_1 \quad (8)$$
$$U_2=V_0.dx_2$$

It appears that the control voltage $U_1$ or $U_2$ applied to each of the generators $G_1$ and $G_2$ will be in a constant ratio with the shift of the generator output shaft with respect to its balance position. This constant ratio $V_0$ is independent of the system to be solved.

In the example considered, $V_0=100$ volts. For a shift $dx$ from balance position equal, for example, to 1/100 of a turn, $$U_1=100\text{ v.}\frac{1}{100}=1\text{ v.}$$

The rotation speed of the output shaft will therefore be equal to ¼ of a turn per second.

It should be noted that the operation of the Switcher has been described with voltages $U_1$ and $U_2$ respectively applied to the output terminals $SR_1$ and $SR_2$ and voltages $V_0f_1$ and $V_0f_2$ collected at the input terminals $ER_1$ and $ER_2$ respectively. In actual practice the reverse takes place, since voltages $V_0f_1$ and $V_0f_2$ are fed to terminals $ER_1$ and $ER_2$. However, since all the elements building up the system of FIG. 1 are reversible, the operation of the Switcher is also reversible and, accordingly, since the system operates correctly in one direction, it also operates correctly in the reverse direction.

Actually the applicants were unable to devise any other clear explanation of the operation of Switcher DR, which operation is far from being evident.

The embodiment of the invention shown in FIG. 1 having been described, the applicants will now attempt to set forth clearly the general concept of their invention.

As already mentioned, equation solver computers comprising generators, which generate the unknowns and feed them to an error calculator network, which in turn, provides at its outputs the respective values of the expressions which are equal to zero in the equation system considered, are known. It is also known to include this error calculator into a feedback loop between the control inputs of the generators and their outputs in order to adjust the magnitudes respectively generated by the generators to be equal to the roots of the equation system.

The applicants have made the following surprising finding, which is indeed the gist of their invention:

If there is provided a computing device, which they have called "Switcher," ($a$) having inputs and $p$ outputs, $q$ being the number of unknowns and $p$ the number of equations of the system and ($b$) being arranged in such a manner that, if a voltage taken as unity is fed to any one of said inputs, there appears at one of the $p$ outputs thereof a voltage equal to $$\frac{\delta f_1}{\delta x_j}$$

($c$) the path between each one of the $q$ inputs and each one of the $p$ outputs being reversible, it suffices to connect the $p$ outputs of this device to the $p$ outputs of the Error Calculator and the $q$ inputs of this device to the respective $q$ inputs of the generators to obtain a system for solving the Equation 1.

In this respect, it should be particularly emphasized that the provision of a device having $q$ inputs and $p$ outputs and providing at one of its $p$ outputs $$\frac{\delta f_1}{\delta x_j}$$

if a voltage taken as unity is fed to one of its inputs, $i$ being, as already mentioned, comprised between 1 and $p$ and $j$ between 1 and $q$ is well within the reach of one skilled in the art of analog computers. Thus, the invention does not lie in the construction of a particular Switcher circuit but in the association of circuit assemblies. Two of these assemblies, the Generators and the Error Calculator, may be considered as known. The invention lies in the association of these two circuits, with a third one, which a man skilled in the art could construct, once the concept of this circuit, as defined above, is suggested. This suggestion is the very gist of the present invention which consequently is not limited to any type of switcher circuit, provided the latter fulfills the above indicated conditions ($a$), ($b$) and ($c$). It may be noted that condition ($c$) means in fact that each one of the $q$ inputs is coupled to one of the $p$ outputs by means of a reversible transfer circuit or path having a transfer characteristic or ratio equal to $$\frac{\delta f_1}{\delta x_j}$$

Figure 2:
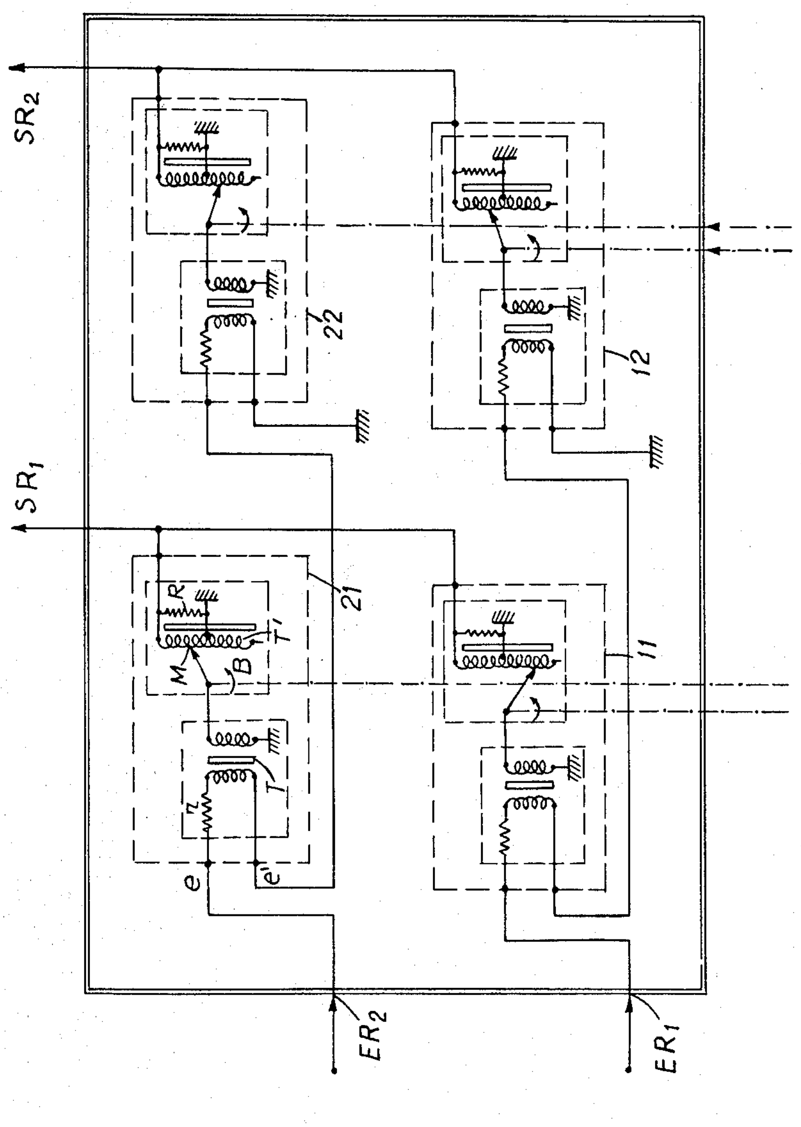
FIG. 2 shows the Switcher illustrated in FIG. 1, with the resistances representing the ohmic losses.

The same system will now be considered with reference to FIG. 2, where transformers T and the auto-transformers T′ have ohmic losses which canot be disregarded, i.e. where the transformers are no longer perfect.

It is well known that in this case, if U and V, I and J are the voltages and currents appearing, respectively, at the primary and secondary terminals of any one of the quadripoles, these quantities are connected by the following relations $$V=NU+rJ \quad (9)$$
$$I=\frac{U}{R}-NJ$$

or $$I=aU-NJ$$

where $a=1/R$ and $r$ and R are two resistances corresponding to the ohmic losses. Everything occurs as though all the ohmic losses were due to these resistance $r$ and R, located as shown in FIG. 2, $r$ being connected in series with terminals $e$ and $e'$, and R being connected in parallel between terminal $s$ and ground. In the present case $r$ is of the order of a few ohms, R of the order of several thousand ohms. In the following, it will be assumed that the quotient $r/R$ is small with respect to $N^2$. Substituting $a$ for $$\frac{1}{R}$$

one may write $$\rho=\frac{ar}{N^2}$$

$\rho$ being the coefficient $$\frac{r}{RN^2}$$

If a voltage U is applied to the primary terminals $s$ of the quadripoles, the secondary terminals $e$ being in an open circuit ($J=0$), it will be found that, the first of Equations 9, may be written $$V=NU$$

On the other hand, if voltage V, thus defined, is applied across the secondary terminals, the primary terminals being closed on resistance R, a voltage will be collected at the primary terminals which is equal to $$U'=\frac{V}{N}\cdot 1/(1-\rho)$$

This voltage is close to U. Factor $$\tau=\frac{1}{1-\rho}$$

may be designated as the "reversibility factor of the quadripole."

For $\rho=0$, $U'=U$ and $\tau=1$. The quadripole is then perfectly reversible and has no losses. When there are losses, $\tau$ is different from 1; in the present case it is slightly different from 1.

Hereinafter, $r_{11}$, $r_{12}$, $r_{21}$, $r_{22}$, $a_{11}$, $a_{12}$, $a_{21}$, $a_{22}$ designate the respective resistances and the admittances which correspond to the losses of to quadripoles 11, 12, 21, 22, respectively.

The operation of the system shown in FIG. 2 will now be considered, $x_{10}$ and $x_{20}$ designating the solutions of the equation system (1). Generators $G_1$ and $G_2$ furnish then respectively these values and the voltages appearing at the inputs $ER_1$, $ER_2$ are zero.

If the outputs of generators $G_1$ and $G_2$ are shifted by $dx_1$ and $dx_2$ from their balance positions, respectively corresponding to $x_{10}$ and $x_{20}$, the control voltages $U_1 \# V_0 dx_1$ and $U_2 \# V_0 dx_2$ will appear at the outputs $SR_1$ and $SR_2$. These equations will be all the closer to reality, as the reversibility coefficient of the quadripoles $i$, $j$ is closer to 1.

It should be noted that, because of their internal losses, the quadripoles of the switcher shown in FIG. 2, are no longer reversible as in the case of FIG. 1. Therefore, one can no longer say that, if the switcher operates correctly from the output to the input, it also operates correctly from the input to the output. Yet, if the losses are not too great this can still be considered to be exact with a high degree of approximation.

It is known that in any quadripole, the primary voltage and current U and I, and the secondary voltage and current V and J are connected to each other by the relation of the type:

$$V=NU+rJ \qquad (10)$$

$$I=aU-MJ$$

the meaning of $a$ and $r$ having been defined above.

The switcher operates correctly if it is built up from quadripoles such that the ratio $\rho=ar/MN$ is small with respect to 1. The quadripoles satisfying this condition may be considered to be reversible. However this may be, control voltages $U_1$ and $U_2$ are zero only if the unknown values fed by generators $G_1$ and $G_2$ to the Error Calculator DC solve Equations 1. The accuracy of the computer assembly thus depends finally only on the Error Calculator DC.

In the following, only passive quadripoles will be considered, i.e., only those for which M=N, although this invention is in no way limited thereto.

Figure 3:
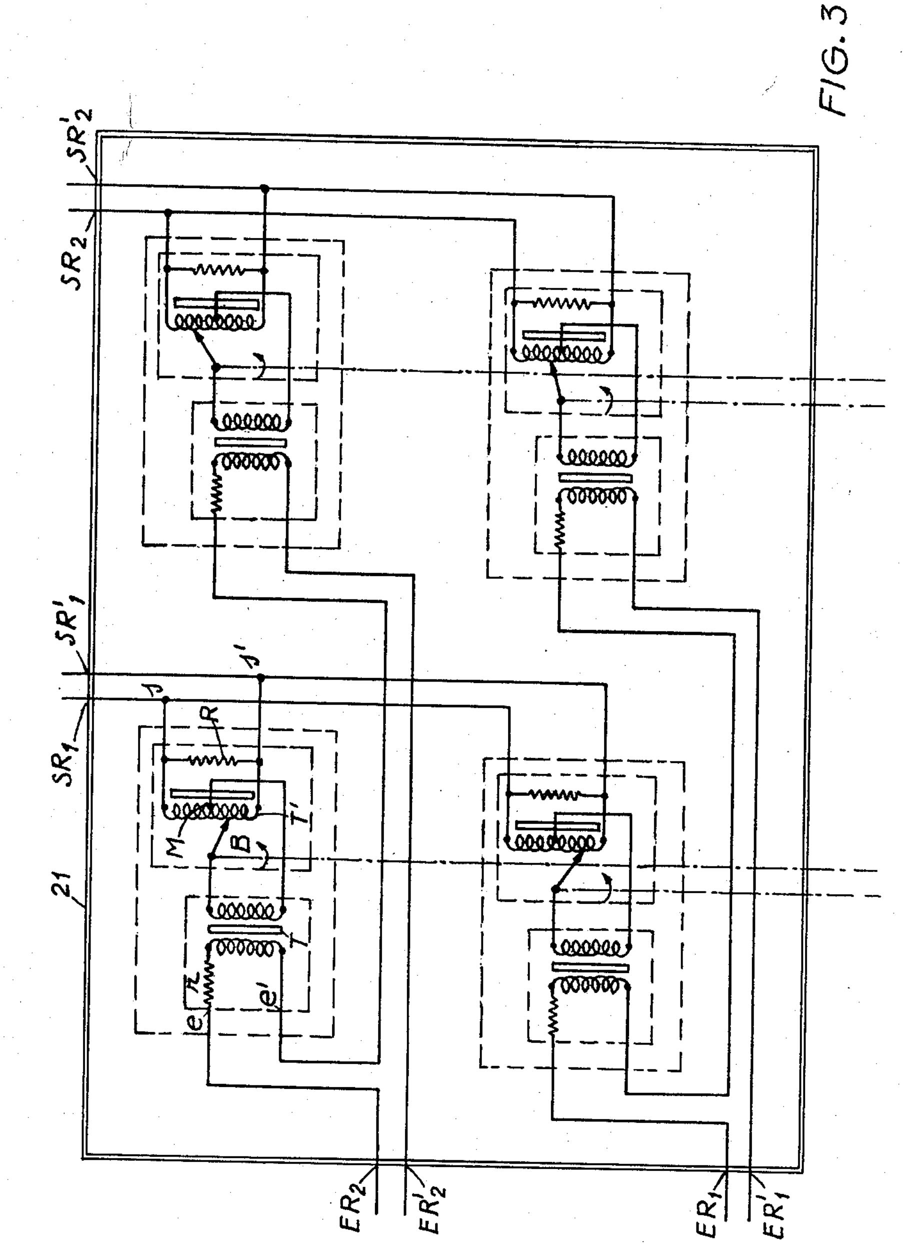
FIG. 3 is a further embodiment of the switcher of FIG. 1.

FIG. 3 illustrates another switcher according to the invention, wherein the quadripoles 11, 12, 21, 22 have no grounded terminals, there being two input terminals $ER_i$, $ER'_i$, which are connected to the secondary terminals $e$ and $e'$ of each equadripole, and two primary terminals $SR_j$, $SR'_j$, which are connected to the two primary terminals $s$ and $s'$. For the remainder, the connections are the same as in FIGS. 1 and 2.

Figure 4:
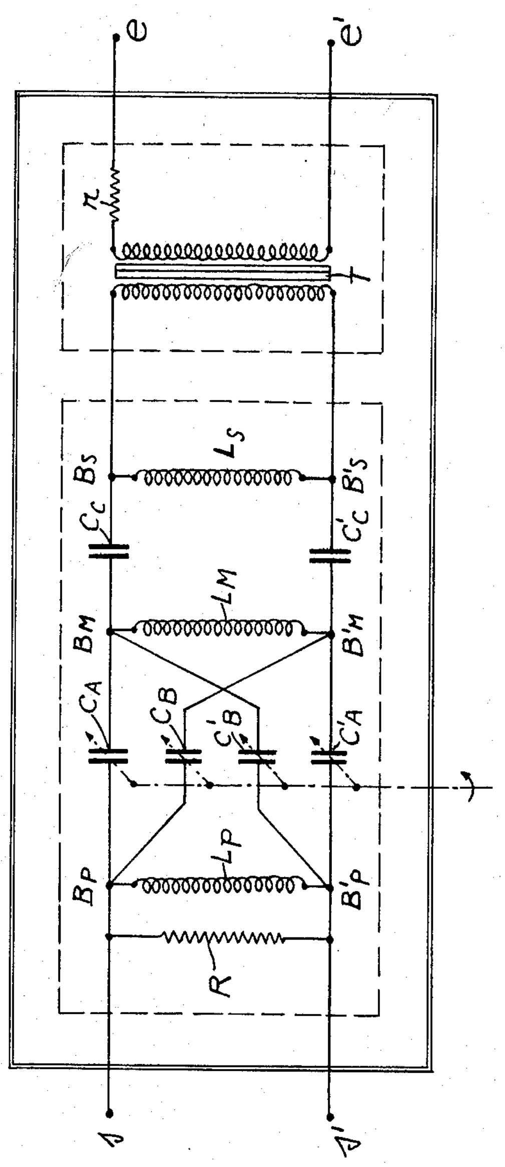
FIG. 4 illustrates a circuit which may be used in a switcher according to the invention.

FIG. 4 shows a quadripole which may be used instead of those used in the Switchers of the preceding figures. This quadripole includes two secondary terminals $e$ and $e'$ and a transformer T of ratio 1. This portion of the quadripole is not adjustable. The adjustable portion of the circuit comprises a computer network as described in the applicants' United States Patent 2,785,853. It is coupled to transformer T, by its terminals $B_s$ and $B'_s$ while its terminals $B_p$ and $B'_p$ are coupled to terminals $s$ and $s'$.

The wiring of the computer circuit is as described in the above mentioned patent. Briefly terminals $B_p$ and $B'_p$, $B_s$ and $B'_s$, and intermediary terminals $B_M$ and $B'_M$ are respectively connected to one another, by means, of respective inductance coils $L_p$, $L_M$ and $L_s$ such that $L_p=L_s=L$ and $$L_M=\frac{L}{2}$$

Fixed capacitors $C_c$ and $C'_c$ equal to 2C connect respectively terminals $B_M$ and $B_s$, $B'_M$ and $B'_s$.

Terminals $B_p$ and $B'_p$ are connected to terminals $B_M$ and $B'_M$ by variable capacitors $C_A$ and $C_B$ and by variable capacitors $C'_A$ and $C'_B$ respectively, all these variable capacitors being controlled by the same shaft B tied to one output $SC_{ij}$. For any instantaneous values of these capacities $C_A=C'_A=C+d$ and $C_B=C'_B=C-d$, $d$ being variable between 0 and C. In addition, $LC\omega_0^2=-1$, i.e. $jC\omega_0=+1/jL\omega_0$. Such a circuit is reversible. The losses are those corresponding to an impedance $r$ connected in series between terminals $e$ and $e'$ and an impedance R connected in parallel across terminals $s$ and $s'$.

It may be shown that the transfer coefficient of this quadripole is equal to $$\frac{d}{C}$$

i.e. varies between −1 and +1.

Q being the quality factor of the inductance coils, ratio may be written $$\rho=\left(\frac{c^2}{d^2}+1\right)\frac{1}{Q^2}$$

If the operating frequency is of the order of 500 kc./s., Q is of the order 300, i.e. for $d=C$, $$\rho=\frac{2}{Q^2}=1/45.000$$

Figure 5:
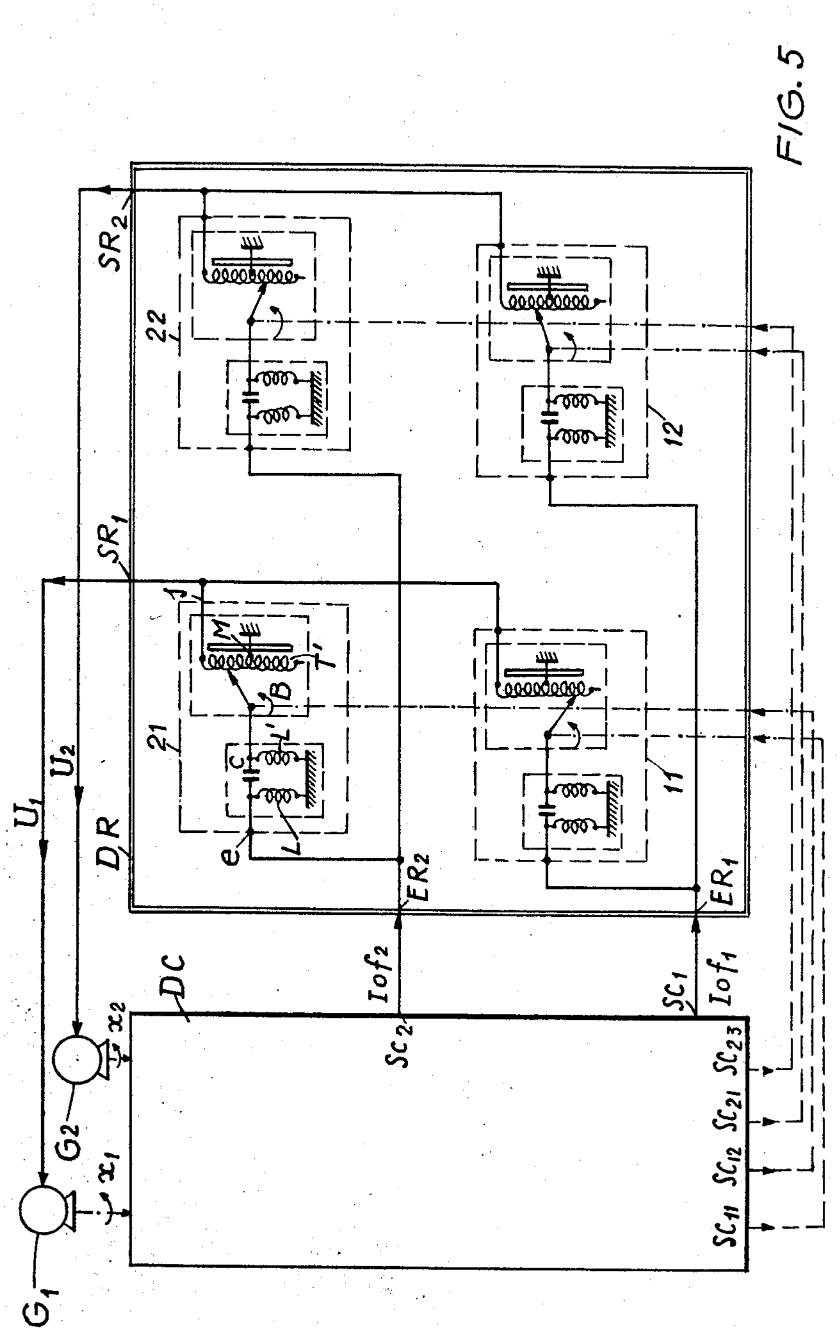
FIG. 5 shows a further switcher according to the invention.

FIG. 5 is a further embodiment, given by way of example, of a Switcher according to the invention, the latter being associated with an Error Calculator delivery error signals which are intensities and not voltages, as has been hereintofore assumed.

The assembly shown in FIG. 5 comprises, in the same manner as that shown in FIG. 1, signal generators $G_1$ and $G_2$ which receive control voltages $U_1$ and $U_2$ and furnish variables $x_1$ and $x_2$ to the Error Calculator DC, which in turn provides at its outputs $SC_1$ and $SC_2$ error signals:

$$J_1=I_0 f_1(x_1, x_2)$$

$$J_2=I_0 f_2(x_1, x_2)$$

wherein $I_0$ is a current of a fixed value, say 100 ma., delivered under low voltage, and having a fixed frequency, say 500 kc./s. It may also be a direct current.

Outputs $SC_{ij}$ are identical to those of FIG. 1. The Switcher DR has two inputs $ER_1$ and $ER_2$ connected to outputs $SC_1$ and $SC_2$, as described above, and two outputs $SR_1$ and $SR_2$ furnishing the control voltages $U_1$ and $U_2$, which, as above, may be between 0 and 100 volts.

It comprises four quadripoles 11, 12, 21, 22, the terminals $s_{ij}$ of which are connected as shown in FIG. 1. Their secondary terminals are in parallel, one of the terminals being grounded.

All the quadripoles are identical and comprise a fixed portion and an adjustable portion, controlled by one of the outputs $SC_{ij}$, and having the same structure as in the case of FIG. 1.

The fixed portion of the quadripole comprises two inductance coils L and L'. Coil L is connected between terminal *e* and ground, and coil L' between ground and one terminal of capacitor C, the other terminal of which is connected to terminal *e*.

Coils L and L' have the same inductance, which is such that, for an operating frequency $f_0$ and an angular velocity$=\omega_0$, $jL\omega_0=1/jC\omega_0$ or $LC\omega_0^2=-1$.

If *u* and *v* are the voltages and *m* and *n* are the currents at the primary and secondary terminals of the fixed portion of the quadripole, i.e. at the terminals of the inductance coils L and L', one may write, disregarding the losses, $$u=jC\omega_0 n \qquad (11)$$

$$v=jC\omega_0 m$$

The voltage at terminal *s* is $U=jC\omega_0\lambda m$, with λ determined as described above by the position of shaft B, i.e. with $$\lambda=\frac{\delta f_i}{\delta x_j}$$

Making $U=jC\omega_0=A_0$, $A_0$ being constant and having the same value for the four quadripoles, and calling U and I, the primary voltage and current, and V and J, the secondary voltage and current, one may write:

$$U=A_0J\lambda \text{ or } \lambda \qquad (12)$$

$$J=\frac{U}{A_0\lambda}$$

Obviously, the assembly described is reversible. $A_0$ is the transfer characteristic of the quadripole.

The operation of the Switcher of FIG. 5 will now be considered, again assuming first that the system is in equilibrium i.e. that $U_1$ and $U_2$ are zero.

The primary terminals *s* of quadripoles 11, 12 being connected in parallel to output $SR_1$ and those of quadripoles 21, 22 to output $SR_2$, relation (12) shows that current $J_{ij}$ is nil.

It follows that current intensities $J_1$ and $J_2$, at inputs $ER_1$ and $ER_2$ of the Switcher which are respectively the sum of two intensities $J_{ij}$, are also zero. Accordingly:

$$J_1=I_0f_1(x_{10}, x_{20})=0$$

$$J_2=I_0f_2(x_{10}, x_{20})=0$$

i.e. values $x_{10}$ and $x_{20}$, for which $U_1$ and $U_2$ are zero, are solutions of system (1).

It will now be assumed that the output shafts of generators $G_1$ and $G_2$ are displaced by $dx_1$ and $dx_2$, from their respective positions corresponding to $x_{10}$ and $x_{20}$, to take position respectively corresponding to $$x_1=x_{10}+dx_1 \text{ and } x_2=x_{20}+dx_2$$

Accordingly:

$$I_0f_1=I_0\left(\frac{\delta f_1}{\delta x_1}dx_1+\frac{\delta f_1}{\delta x_2}dx_2\right)$$

and $$I_0f_2=I_0\left(\frac{\delta f_2}{\delta x_1}dx_1+\frac{\delta f_2}{\delta x_2}-dx_2\right)$$

Since $$J_{ij}=A_0\frac{\delta f_1}{\delta x_j}\cdot U_j$$

it may be readily shown, in the same manner as above, that $$U_1=\frac{I_0}{A_0}dx_1 \qquad (13)$$

$$U_2=\frac{I_0}{A_0}dx_2$$

It will be noted again that ratios $$\frac{U_j}{dx_j}=\frac{I_0}{A_0}$$

depend only on the characteristics of the Switcher.

Figure 6:
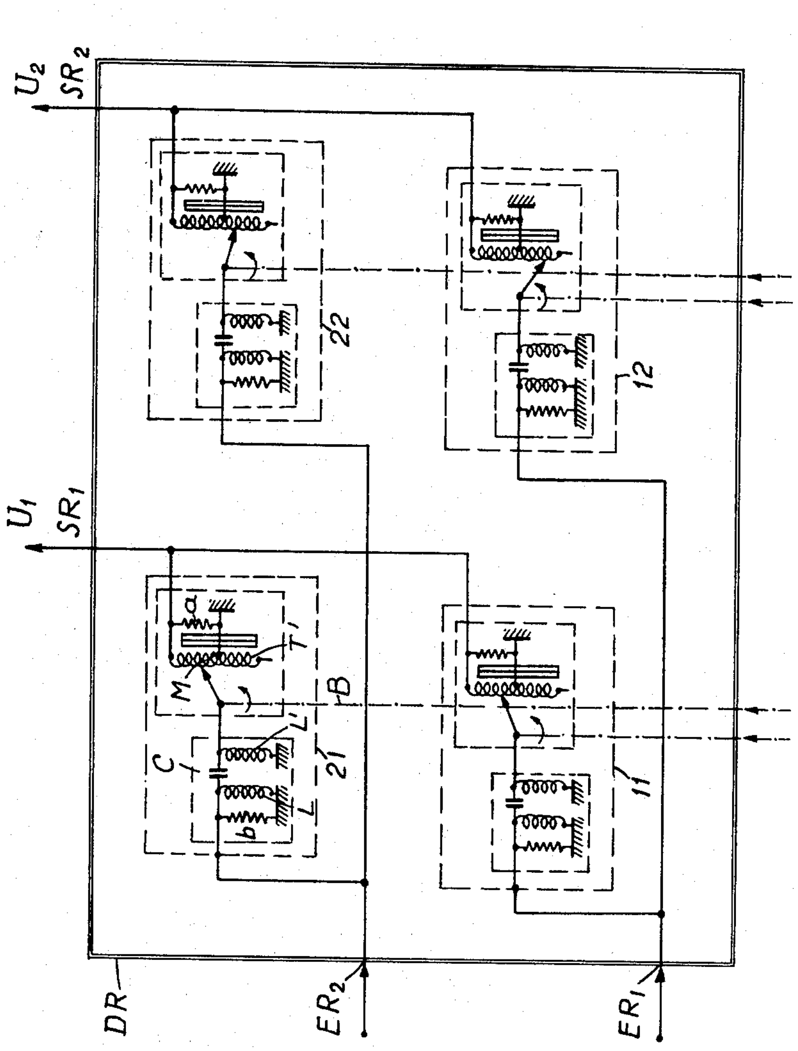
FIG. 6 shows the switcher of FIG. 5 with the resistances illustrated.

The same system will now be considered with reference to FIG. 6, taking into account the ohmic losses inherent to coils L and L' and to auto-transformers T'.

Calling *a* the primary input admittance of quadripole *ij*, i.e. the admittance of the quadripole with its secondary terminals shorted, and *b* the secondary input admittance, i.e. the admittance of the quadripole with its primary terminals shorted, the admittances may be considered as those of two resistors connected, respectively, between *s* and ground, and between *e* and ground.

Then:

$$I=aU+AV \qquad (14)$$

$$J=AU+bV$$

where $A=jC\omega_0\lambda$; generally in the quadripoles described:

$$ab<<C^2\omega_0^2\lambda^2$$

Putting $$\frac{a.b.}{C^2\omega_0^{2\lambda 2}}=\rho'\lesssim 1$$

As in the previous case, if a voltage U is applied to primary terminals *s*, the secondary terminals being short-circuited, a current $J=AU$ is collected at these terminals. If current J is fed into the secondary terminals, a voltage U' appears at the primary terminals, with $$U'=\frac{U}{1-\rho}$$

i.e. U' being very close to U, since it is of the order of 0.10 to 0.100.

It may be readily shown, in the same manner as in the case of FIG. 5, that voltages $U_1$ and $U_2$ are zero for values $x_{10}$ and $x_{20}$ of the variables $x_1$ and $x_2$, which are roots of the equation system (1).

Also, if the output shafts of generators $G_1$ and $G_2$ are shifted by $dx_1$ and $dx_2$, respectively, from their positions corresponding to $x_{10}$ and $x_{20}$, the control voltages are substantially equal to:

$$U_1=\frac{I_0}{A_0}\cdot dx_1 \qquad (15)$$

$$U_2=\frac{I_0}{A_0}\cdot dx_2$$

These relations are all the more exact as ratio ρ is smaller.

In other words, as in the previous case, the ratios $$\frac{dxj}{U_j}$$

will be independent of the system to be solved and will be controlled by the choice of the ratio It is known that, broadly, if U and I, V and J are the respective voltages and currents at the primary and secondary terminals of a quadripole:

$$\frac{I_0}{A_0}$$

$$I=aU+AV \qquad (16)$$

$$J=BU+bV$$

wherein A and B are not necessarily equal.

A Switcher such as that shown in FIG. 5 could be built up from quadripoles verifying relations (16), with the product AB very great with respect to the product *ab*. Such quadripoles may be considered to be reversible.

However, in the course of this specification only passive quadripoles, where $A=B$, will be considered.

It is obvious that these results would be valid also in the case of active quadripoles.

Figure 7:
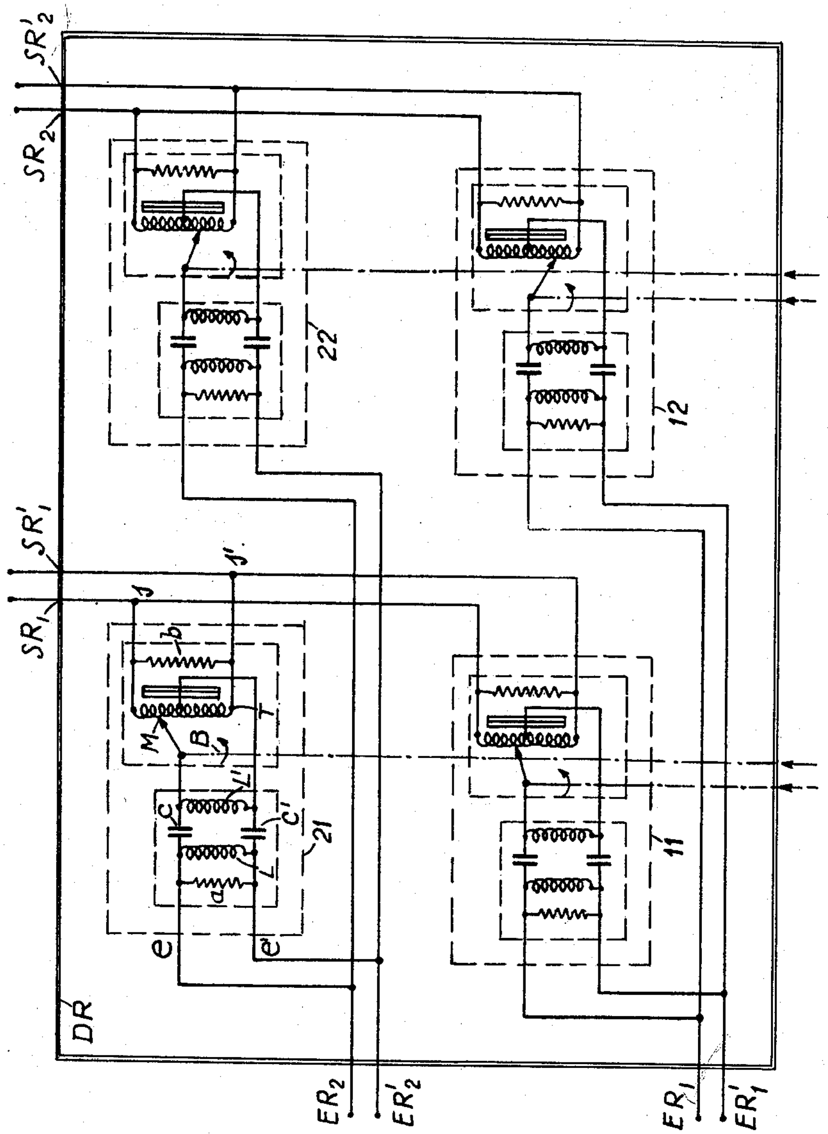
FIG. 7 is another switcher according to the invention.

FIG. 7 shows the same Switcher as that of FIG. 6, except that there are two input terminals, ER and ER′, none of them being grounded. The same reference numbers as in FIG. 3 have been used.

The adjustable portion of the quadripoles of FIG. 7 is identical to that of the quadripoles shown in FIG. 3 and the connections to terminals $SR_j$, $SR'_j$ are the same.

The fixed portion comprises two capacitors C and C′ and two equal inductance coils L and L′ connected as shown to terminals $e$, $e'$ which are respectively connected to terminals $ER_1$ and $ER'_1$ of the switcher. In this quadripole, which is of the type described in the above mentioned patent $L=L'$, $C=C'$, and $LC_0^2=-1$, for the operating frequency.

Figure 8:
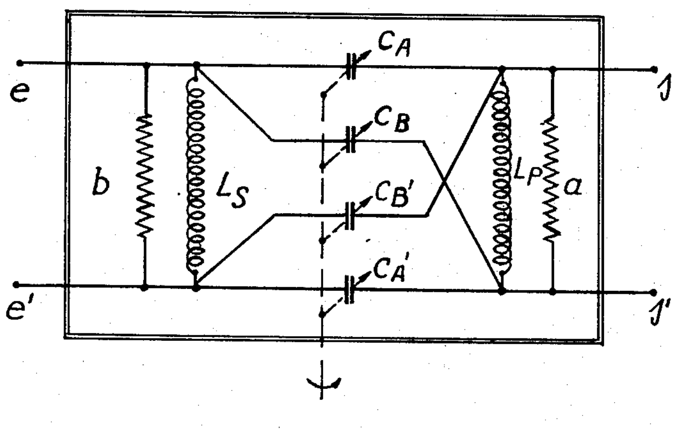
FIG. 8 shows a quadripole which may be used in the switcher of FIG. 7.

Quadripoles 11 and 22 may be substituted by the quadripole illustrated in FIG. 8, which is identical to the adjustable portion of the network shown in FIG. 4, the same reference numbers being used in both figures for designating the same elements.

The transfer characteristic of this quadripole is equal to $jd_\omega$; it can vary from $-jC\omega_0$ to $+jC\omega_0$. The primary and secondary input admittances are equal to: $1/QL_0$ or $C\omega_0/Q$, Q being the quality factor of the inductance coils.

It may be shown that $$\rho=\frac{(C)^2}{(d)}\cdot\frac{1}{Q^2}$$

As long as $C/d$ does not become too great, Q being of the order of 500 for a frequency $f$ of 500 kc./s., the reversibility of the quadripole is nearly perfect.

It will now be discussed how a switcher according to the invention may be used to solve a system of equations such as $$f_1\,(x_1, x_2)=O \qquad (17)$$
$$f_2\,(x_1, x_2)=O$$
$$f_3\,(x_1, x_2)=O$$

Figure 9:
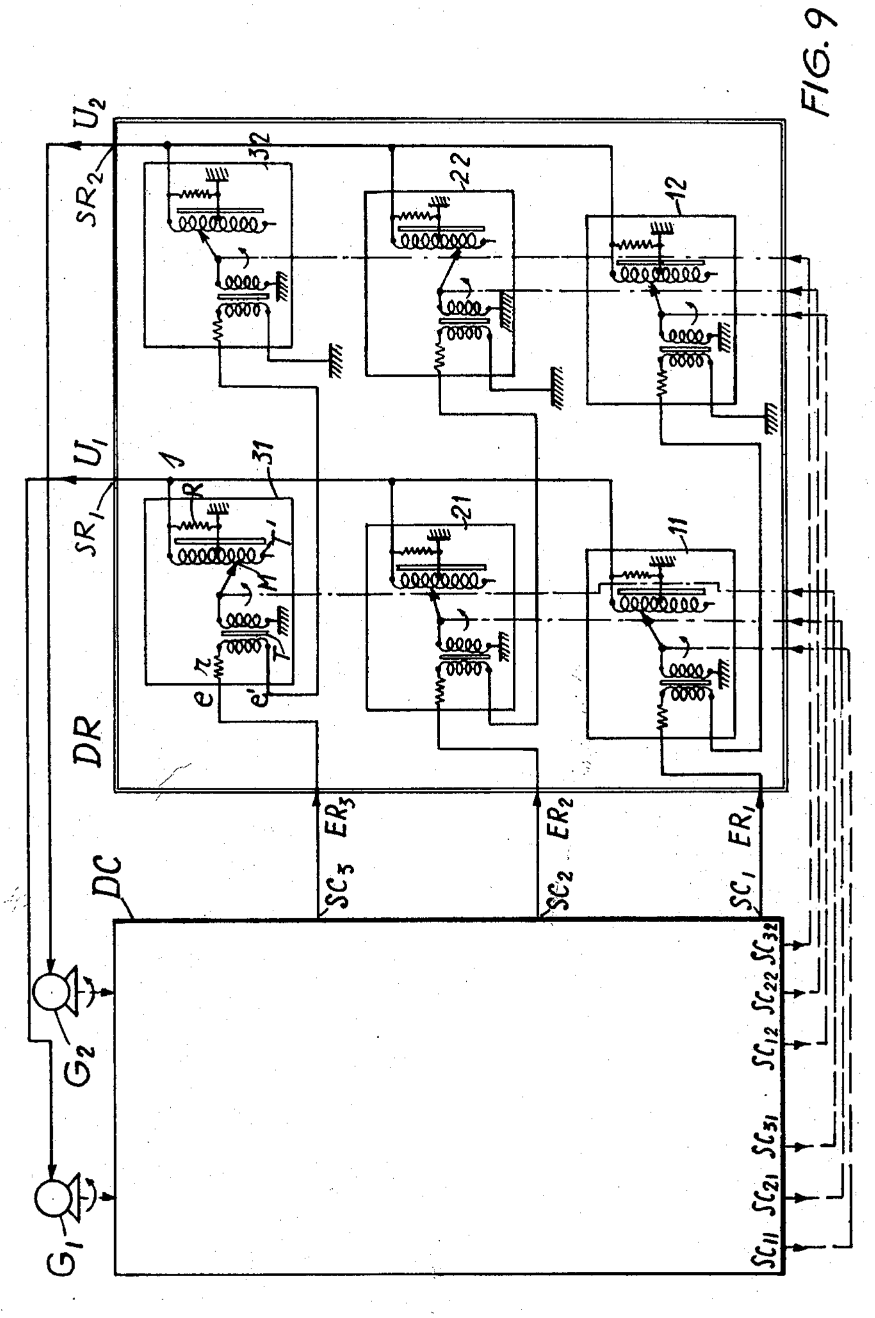
FIGS. 9 and 10 illustrate switchers for systems of three equations with two unknowns.
Figure 10:
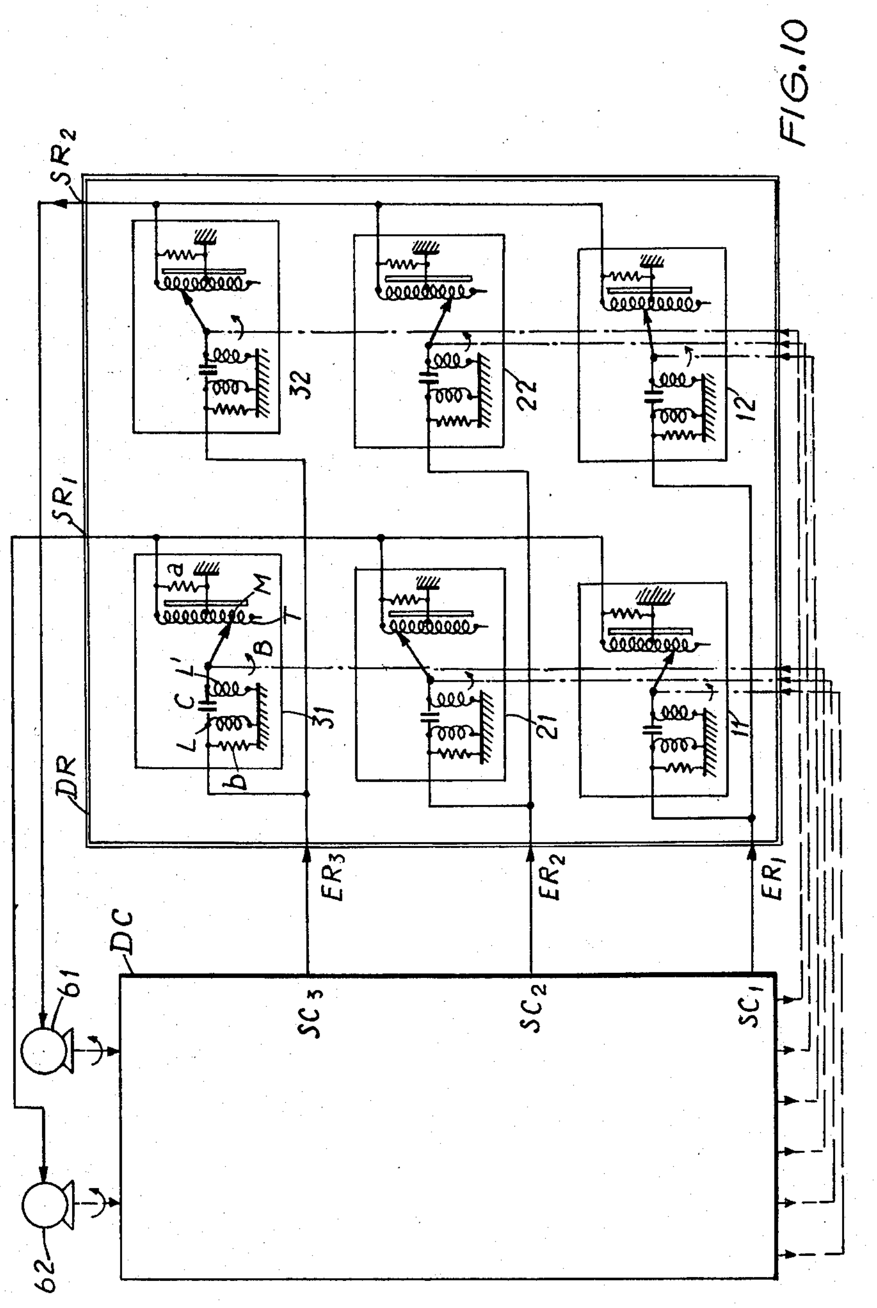

FIG. 9 and FIG. 10 represent two computer systems including a switcher according to the invention and wherein error magnitudes are voltages and intensities respectively.

These systems comprise servomechanisms $G_1$ and $G_2$ and an Error Calculator similar to those of the systems shown in FIG. 1 to 5, but having three outputs $SC_1$, $SC_2$, $SC_3$ and six outputs $S_{11}$, $S_{12}$, $S_{21}$, $S_{22}$, $S_{31}$ and $S_{32}$ since there are three unknowns in the case considered. Switcher DR comprises three inputs $ER_1$ to $ER_3$ and two outputs $SR_1$ and $SR_2$ and six reversible quadripoles 11, 12, 21, 22, 31 and 32.

Both in FIG. 9 and in FIG. 10 quadripoles 11, 21, 31 and 12, 22, 32 have their primary terminals connected in parallel, to outputs $SR_1$ and $SR_2$ respectively. In FIG. 9 the quadripoles are connected by pairs in series to terminals $ER_1$ to $ER_3$ in the same manner as in FIG. 1. In FIG. 10, the quadripoles are connected in parallel by pairs to inputs $ER_1$ to $ER_3$ in the same manner as in FIG. 5.

The quadripoles of FIG. 9 are identical to those of FIG. 1. They present losses which, as in the case of FIG. 2, may be considered as resulting from resistances $r$ and R, connected as shown in that figure.

Let $r_{11}$, $r_{12}$, $r_{21}$, $r_{22}$, $r_{31}$, $r_{32}$ be the secondary input impedances of these quadripoles. It may be shown that values $x_{10}$, and $x_{20}$ of $x_1$ and $x_2$, for which no control voltages are applied to generators $G_1$ and $G_2$ and which will be called solutions of system (17), are roots of the following system having two unknowns:

$$\frac{V_0f_1}{r_{11}+r_{12}}\cdot\frac{\delta f_1}{\delta x_1}+\frac{V_0f_2}{r_{21}+r_{22}}\cdot\frac{\delta f_2}{\delta x_1}+\frac{V_0f_3}{r_{31}+r_{32}}\cdot\frac{\delta f_3}{\delta x_1}=0 \qquad (18)$$

$$\frac{V_0f_1}{r_{11}+r_{12}}\cdot\frac{\delta f_1}{\delta x_2}+\frac{V_0f_2}{r_{21}+r_{22}}\cdot\frac{\delta f_2}{\delta x_2}+\frac{V_0f}{r_{31}+r_{32}}\cdot\frac{\delta f_3}{\delta x_2}=0$$

These relations are the first derivatives with respect to $x_1$ and $x_2$ of $$\Phi=\frac{V_0}{r_{11}+r_{12}}\cdot f_1^2+\frac{V_0}{r_{22}+r_{22}}\cdot f_2^2+\frac{V_0}{r_{32}+r_{32}}\cdot f_3^2$$

Accordingly, it results from relations (18) that generators $G_1$ and $G_2$ will have zero control voltages if expression $\Phi$ has, for values $x_{10}$ and $x_{20}$, either a maximum or a minimum value. The equilibrium will obviously be stable only for the minimum value.

It will be noted that expression $\Phi$ is a weighted sum of the squares of expressions $f_1$, $f_2$ and $f_3$.

The weighted coefficients of these expressions are, respectively:

$$\frac{V_0}{r_{11}+r_{12}}\cdot\frac{V_0}{r_{21}+r_{22}} \text{ and } \frac{V_c}{r_{31}+r_{32}}$$

These coefficients may be modified by connecting in parallel with the secondary terminals of the quadripoles, impedances $p_1$, $p_2$, $p_3$, which are high with respect to the impedances $r_{11}+r_{12}$. The weighted factors will then become approximately:

$$\frac{V_0}{p_1},\frac{V_0}{p_2} \text{ and } \frac{V_0}{p_3}$$

It can be readily shown that, if the output shafts of generators $G_1$ and $G_2$ are shifted by values $dx_1$ and $dx_2$ with respect to their positions corresponding to $x_{10}$ and $x_{20}$, the control voltages will be, with a first approximation, $$U_1=V_0dx_1$$
$$U_2=V_0dx_2$$

In the case of FIG. 10 the quadripoles are similar to those used in FIG. 6, the secondary input admittances $a_{11}$, $a_{12}$, $a_{21}$, $a_{22}$, $a_{31}$, $a_{32}$ corresponding to resistors mounted as shown. It can be shown, in the same manner in the case of FIG. 9, that $U_1$ and $U_2$ are zero for values $x_{10}$ and $x_{20}$ of $x_1$ and $x_2$ which satisfy the following system:

$$\frac{A_0I_0}{a_{11}+a_{12}}f_1\frac{\delta f_1}{\delta x_1}+\frac{A_0I_0}{a_{21}+a_{22}}f_2\frac{\delta f_2}{\delta x_1}+\frac{A_0I_0}{a_{31}+a_{32}}f_3\frac{\delta f_3}{\delta x_1}=0 \qquad (20)$$

$$\frac{A_0I_0}{a_{11}+a_{12}}f_1\frac{\delta f_1}{\delta x_2}+\frac{A_0I_0}{a_{21}+a_{22}}f_2\frac{\delta f_2}{\delta f_2}+\frac{A_0I_0}{a_{31}+a_{32}}f_3\frac{\delta f_3}{\delta f_2}=0$$

Values $x_{10}$ and $x_{20}$ render in this case minimum the expression:

$$\psi=\frac{A_0I_0}{a_{11}+a_{12}}f_1^2+\frac{A_0I_0}{a_{21}+a_{22}}f_2^2+\frac{A_0I_0}{a_{31}+a_{32}}f_3^2 \qquad (21)$$

In the same manner as above, the terms of this relation may be weighted by shunting the admittances $a_{11} \ldots a_{32}$ by higher admittances $q_1$, $q_2$, $q_3$.

Also in the same manner as in the case of FIG. 9, if the generator output shafts are shifted by $dx_1$ and $dx_2$ from their positions corresponding to $x_{10}$ and $x_{20}$, the control voltages will be, with a first approximation $$U_1=\frac{I_0}{A_0}\cdot dx_1$$

$$U_2=\frac{I_0}{A_0}\cdot dx_2$$

Figure 11:
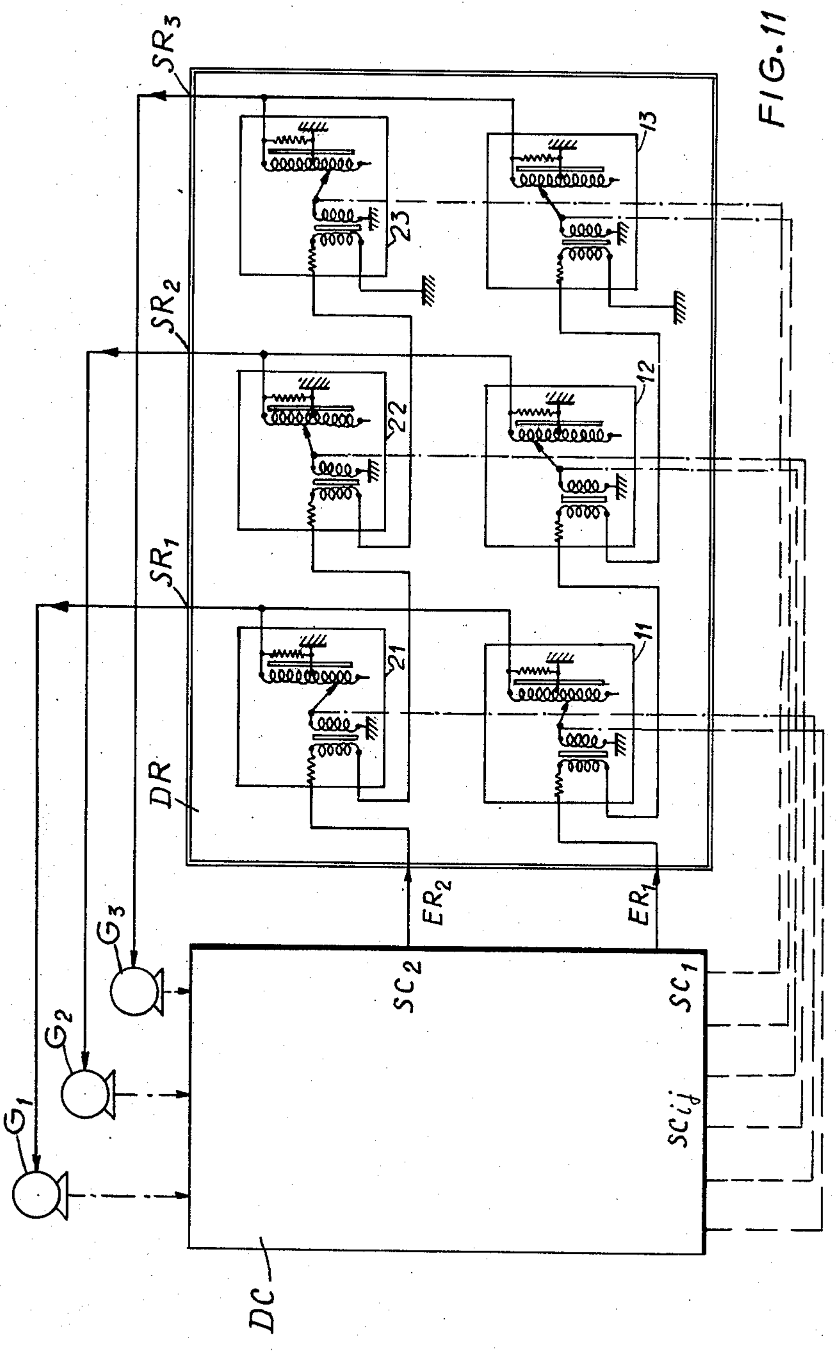
FIGS. 11 and 12 show switchers for systems of two equations with three unknowns.
Figure 12:
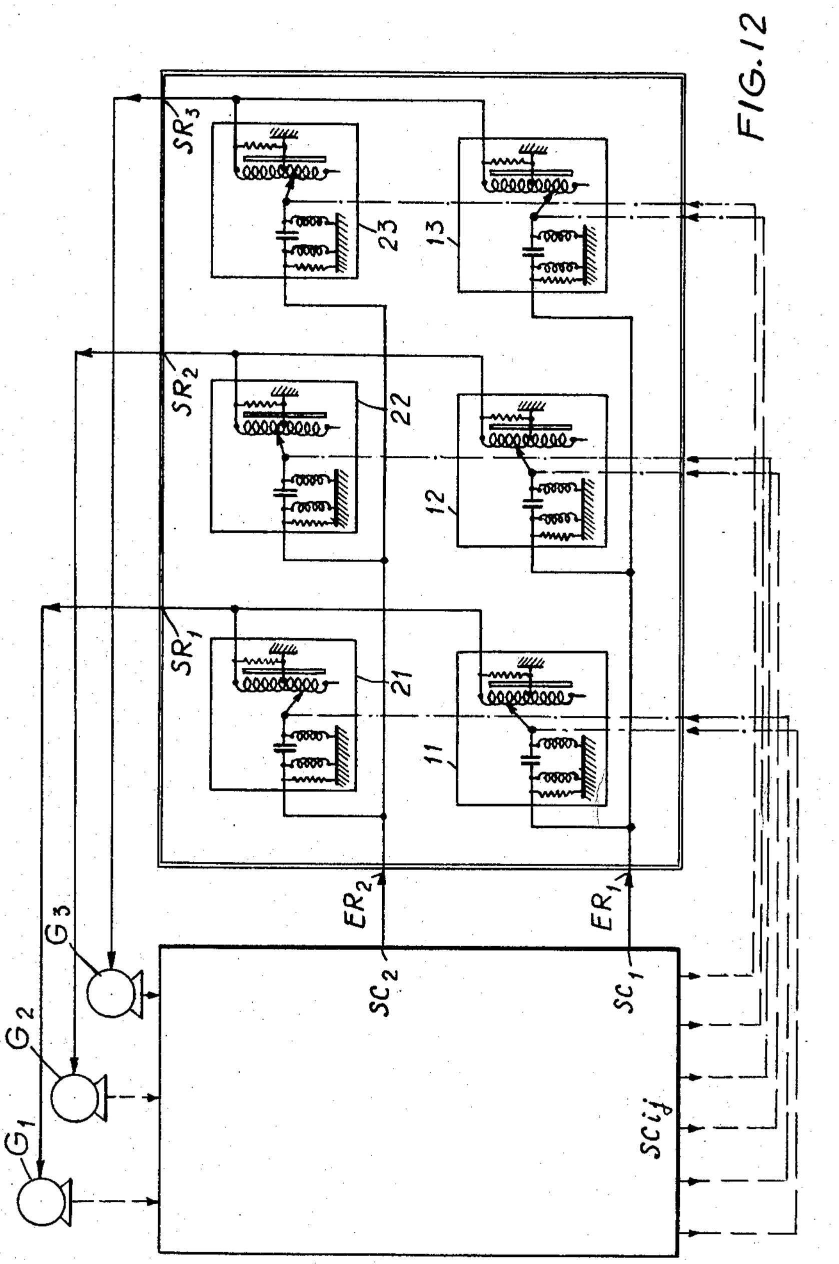

FIGS. 11 and 12 show arrangements capable of solving systems of two equations with three unknowns:

$$f_1(x_1, x_2, x_3)=0$$
$$f_2(x_1, x_2, x_3)=0 \qquad (22)$$

The systems shown in FIGS. 11 and 12 are entirely similar to those of FIGS. 2 and 6 respectively, except that there are three generators $G_1$, $G_2$, $G_3$ instead of two, and six outputs $SC_{ij}$, instead of four.

Since the system to be solved comprises two equations with three unknowns, it has an infinity of solutions with one degree of freedom. These solutions define in space a curve which is defined by coordinates $x_1$, $x_2$, $x_3$. It can be shown that control voltages $U_1$, $U_2$, $U_3$ are equal to zero whenever generators $G_1$, $G_2$, $G_3$ provide at their outputs a system of values $x_{10}$, $x_{20}$, $x_{30}$ corresponding to a point on this curve.

If the output shafts of generators $G_1$, $G_2$ and $G_3$ are shifted by $dx_1$, $dx_2$, $dx_3$, from their respective positions corresponding to $x_{10}$, $x_{20}$ and $x_{30}$, respectively, two cases may occur:

(*a*) Values $x_{10}+dx_1$, $x_{20}+dx_2$, $x_{30}+dx_3$ are also solutions of the system (22); in this case, it may be shown that $U_1$, $U_2$, $U_3$ remain equal to zero.

(*b*) Values $x_{10}+dx_1$, $x_{20}+dx_2$, $x_{20}+dx_3$ are not solutions; in this case, the voltages $U_1$, $U_2$, $U_3$ are no longer equal to zero and tend to set the generators into positions $x_{11}$, $x_{21}$, $x_{31}$, respectively, such that the values:

$$x_{10}+dx_1-x_{11},\ x_{20}+dx_2-x_{21},\ x_{30}+dx_3-x_{31}$$

be as small as possible.

Figure 13:
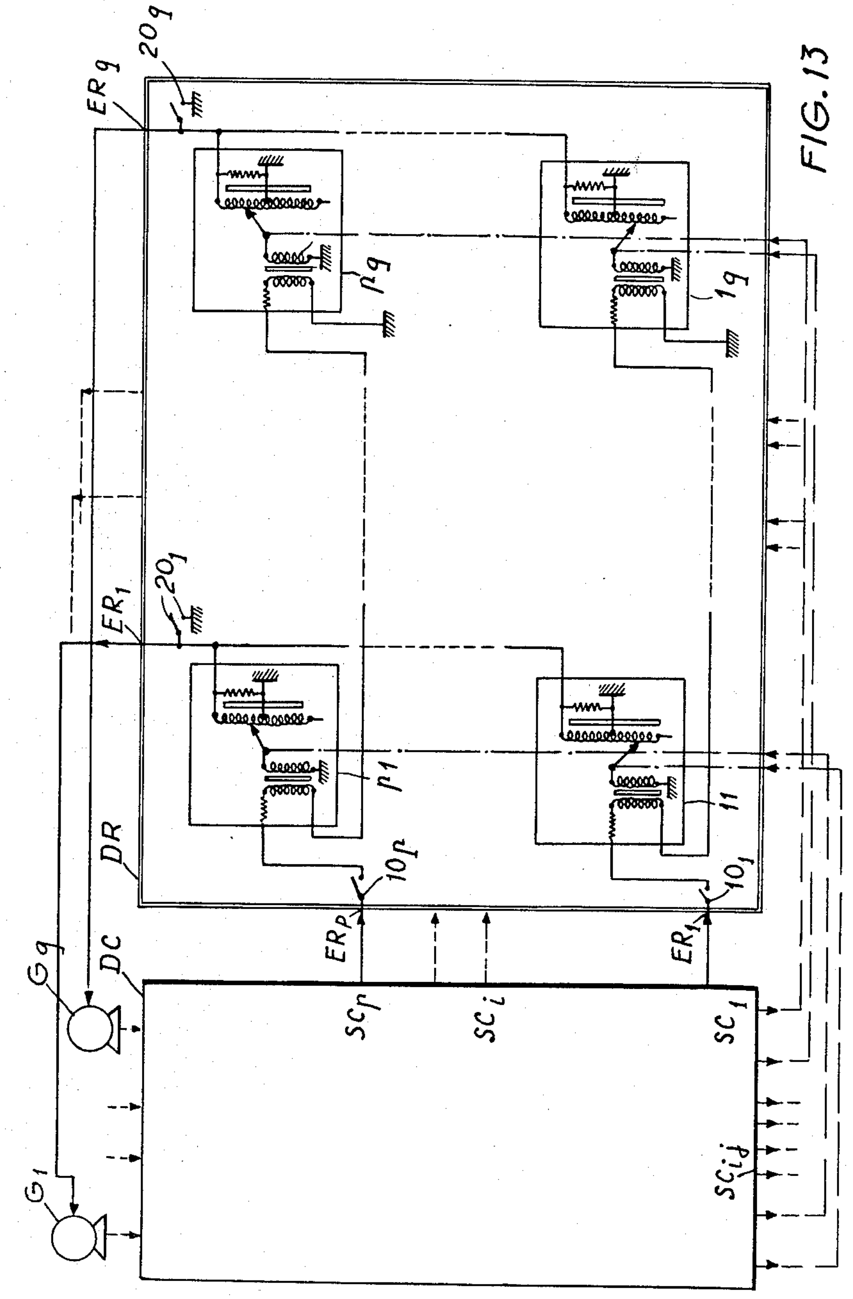
FIGS. 13 and 14 illustrate switchers for solving systems of $p$ equations with $q$ unknowns.
Figure 14:
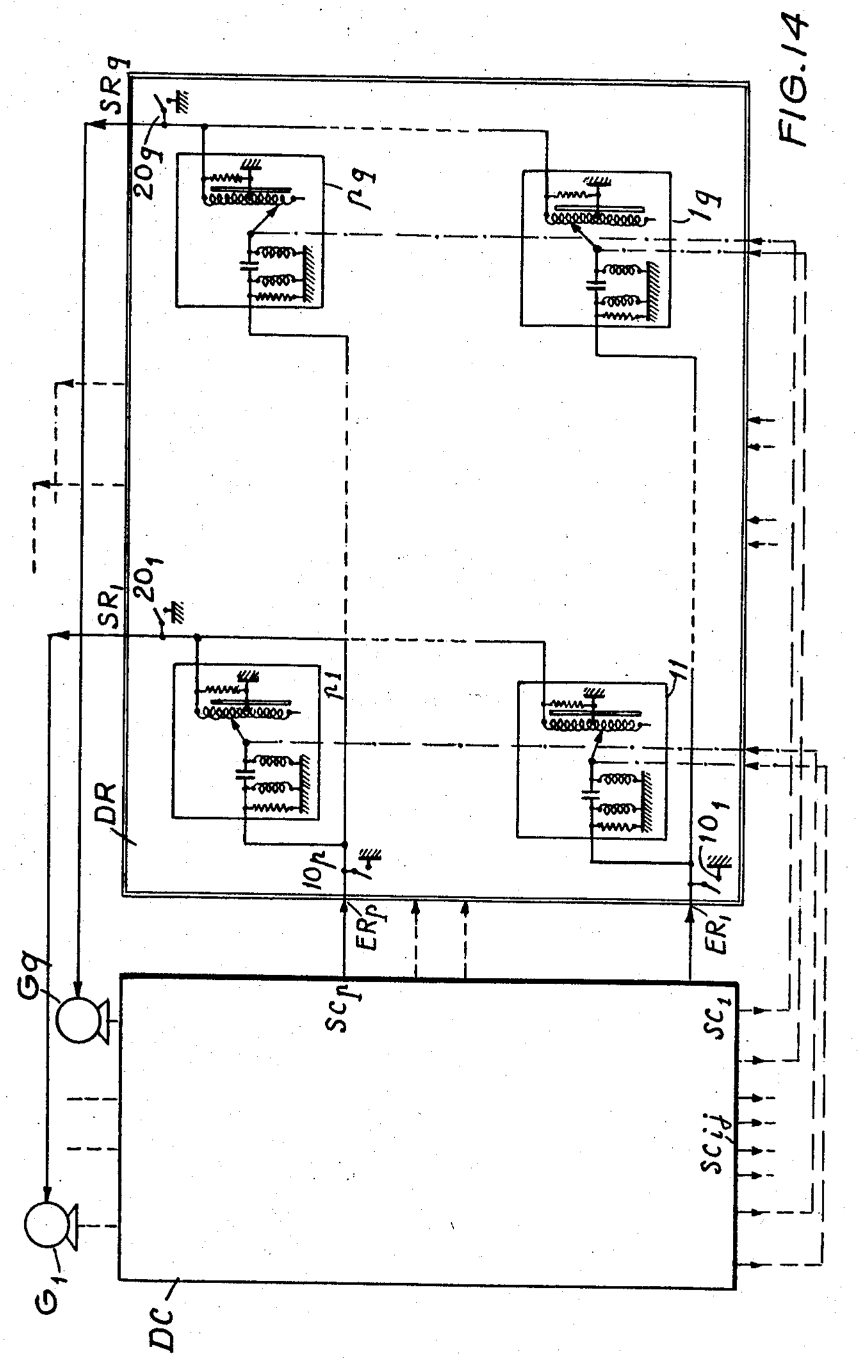

FIGS. 13 and 14 illustrate two systems capable of solving a system of $p$ equations with $q$ unknowns, $p$ being equal to or different from $q$, i.e. the system $$f_1(x_1 \ldots x_q)=0$$
$$* \quad * \quad * \quad * \quad *$$
$$f_p(x_1 \ldots x_q)=0 \qquad (23)$$

The system shown comprises $q$ generators $G_1, G_2 \ldots G_q$, in number equal to the number of unknowns, and the error Calculator DC has electrical outputs $SC_1$ to $SC_p$ and $pq$ mechanical outputs $SC_{ij}$.

In FIG. 13, the Switcher comprises $p$ inputs $ER_1$ to $ER_p$ which are respectively connected to outputs $SC_1$ to $SC_p$ of the Error Calculator DC and $q$ outputs $SR_1$ to $SR_q$ delivering $q$ control voltages $U_1 \ldots U_q$. The quadripoles are mounted and operate in the same way as in FIG. 1.

Switching devices $\mathbf{10}_1 \ldots \mathbf{10}_p$ are provided for disconnecting the inputs $ER_1$ to $ER_p$ of the Switcher and switching devices $\mathbf{20}_1$ to $\mathbf{20}_q$ are provided for grounding the outputs $SR_1$ to $SR_q$, when the number of the unknowns is smaller than $q$ and the number of equations is smaller than $p$, respectively.

The arrangement in FIG. 14 differs from that shown in FIG. 13 in that the quadripoles are of the same type as in FIG. 5.

In the case of FIG. 13, the computer delivers error signals which are voltages and in the case of FIG. 14 they are current intensities.

The operation of the system shown in FIGS. 13 and 14 may be summarized as follows:

(*a*) For $p=q$, the control voltages provided by the Switcher are zero, if generators $G_1$ to $G_q$ provide roots of the systems of equations considered. If the outputs of the generators are shifted by $dx_1 \ldots dx_p$, with respect to their respective balance positions, the control voltages are:

$$U_1=V_0dx_1$$
$$U_p=V_0dx_p$$

(*b*) For $p>q$, the control voltages are zero, when the expression $$\Phi^2=V_0\sum_{i=1}^{i=p}\frac{f_i^2}{\sum_{j=1}^{j=1} r_{ij}}$$

is a minimum, or, when the expression $$\psi^2=A_0I_0\sum_{i=1}^{i=p}\frac{f_i^2}{\sum_{j=1}^{j=q} a_{ij}}$$

is a minimum.

(*c*) For $p<q$, the control voltages $U_1$ to $U_q$ are zero, whenever the generators $G_1$ to $G_q$ provide one of the infinity of solutions of the problems.

Figure 15:
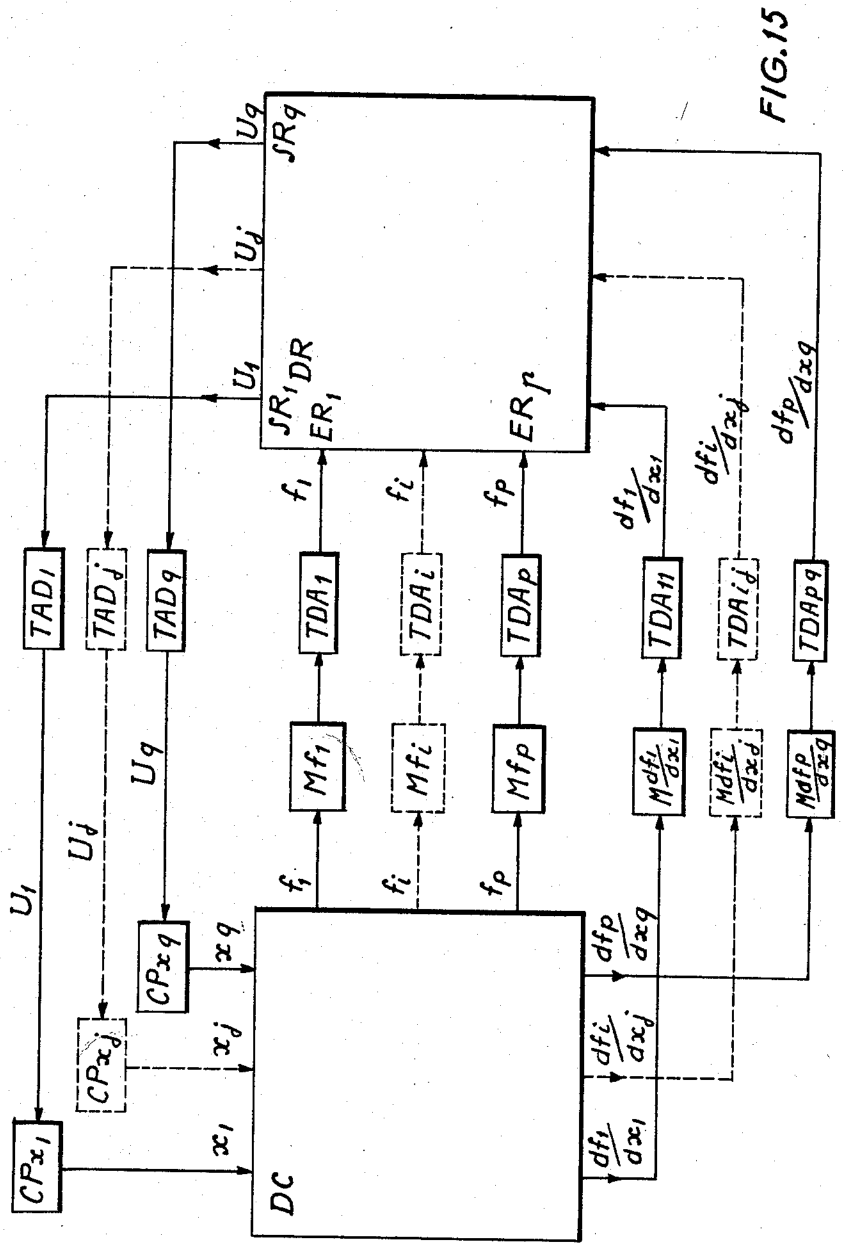
FIG. 15 shows an arrangement wherein a switcher of the invention is associated with a digital calculator.

FIG. 15 illustrates an arrangement comprising a Switcher according to the invention which is associated with a digital computer.

It is known that the solution of implicit equation systems, such as those considered in the present application, is hardly obtainable with digital calculator devices. However, the solution of such equations is made possible by associating a Switcher according to the invention with digital computer devices.

In FIG. 15, Switcher DR is, by way of example, assumed to be of the type comprising voltage to voltage transformers.

The system shown in FIG. 15 comprises:

(*a*) Storage devices (or a single storage device) $CP_{x1}$ to $CP_{xq}$ wherein digits $x_1$ to $x_q$ may be stored and which, upon reception of suitable orders, are capable of modifying these digits $x_j$ as a function of the information $U_1 \ldots U_q$ fed thereto. For example, each new digit is tied to that previously stored by the relation:

$$\text{new } x_j=\text{previously stored } x_j+U_j \qquad (26)$$

(*b*) A conventional digital computer DC capable of receiving data, such as digits $x_j$, and deriving therefrom digits $f_i$ and $$\frac{\partial f_i}{\partial x_j}$$

(*c*) Memory devices $Mf_1$ to $Mf_p$ for storing digits $f_1$ to $Ff_p$ and memory devices $$M\frac{\partial f_i}{\partial x_j}$$

for storing digits $$\frac{\partial f_i}{\partial x_j}$$

(*d*) Devices $TDA_1$ to $TDA_p$ which convert into analog electrical magnitudes, i.e. voltages in the present case, digits $f_1$ to $f_p$ derived from storage devices $Mf_1$ to $Mf_p$.

(*e*) Devices $TDA_{ij}$ which receive digits $$\frac{\partial f_i}{\partial x_j}$$

and feed them, as respective transfer coefficients, to the quadripoles of Switcher DR, so as to have:

$$N_{ij}=\frac{\partial f_i}{\partial x_j}$$

(*f*) Analog-to-digital converters $TDA_1$ to $TDA_q$ which receive from the Switcher voltages $U_1$ to $U_q$ and convert them into digital signals, to apply them to storage devices $CP_{x1}$ to $CP_{xg}$.

All the above mentioned devices are well known in the computing techniques, both analog and digital. Analog to digital and digital to analog converters are well known in the art. Such converters are, for example, described in the "Notes on Analog Digital Conversion Techniques" by Susskind. Memory or storage devices are also well known in the art. For example multivibrators or pulse counters are able to perform the sequential operation: new value of $x_1$=former value of $x_1+U_1$, $x_1$ and $U_1$ being members of pulses; memory devices are described, for example, in "Digital Computing Systems" by Samuel B. Williams, McGraw-Hill (1959), page 88.

The operation of the system of FIG. 15 may be, for example sequential and include the following sequences:

*First sequence*

Upon reception of an order from the computer clock the following operations take place:

Storage devices $Cp_{x1}$ to $Cp_{xq}$ deliver to calculator DC the initial digital data $x_{10}$ to $x_{q0}$.

Calculator DC provides in succession digital data $f_1$ to $f_p$, as a function of the initial data $x_{10}$ to $x_{q0}$, and feeds these data to storage devices $Mf_1$ to $Mf_p$, respectively.

Calculator DC also computes $$\frac{f_1}{x_1}$$

to $$\frac{\partial f_p}{\partial x_p}$$

and feeds these data to storage devices $$M\frac{\partial f_i}{\partial x_j}$$

*Second sequence*

Storage devices $Mf_1$ to $Mf_p$ and $$M\frac{\partial f_i}{\partial x_j}$$

are ordered to feed the stored data to digital-to-analog converters $TDA_1$ to $TDA_p$ and $TDA_{ij}$. The latter respectively furnish voltages $f_i$ and the mechanical magnitudes which determine the transfer coefficients of the quadripodes of Switcher DR.

The Switcher then provides voltages $U_1$ to $U_q$, as described above. These analog data are converted into digital data in translators $TAD_1$ to $TAD_q$.

*Third sequence*

All the quadripoles of Switcher DR having thus their transfer coefficients respectively equal to $$\frac{\partial f_i}{\partial x_j}$$

voltages $f_1$ to $f_p$ are simultaneously applied to inputs $ER_1$ to $ER_p$ respectively. Switcher DR provides simultaneously at its outputs $SR_1$ to $SR_q$, the control voltages $U_1$ to $U_q$, which remain constant during the whole of the duration of this sequence, while the voltages $f_i$, which are applied to the inputs of Switcher DR, and the transfer coefficients of the quadripoles remain constant.

During the same sequence, voltages $U_1$ to $U_q$ are translated into digital values by converters $TAD_1$ to $TAD_q$. There values are fed to storage devices $CP_{x_1}$ to $CP_{x_q}$ and modify the data $x_1$ to $x_q$ stored therein, so as to have, for example, $$\text{new } x_1 = \text{former } x_1 + U_1$$

The cycle is then repeated until all the values $U_1$ to $U_q$ are nil. At this moment, values $x_1$ to $x_q$, which are stored in storage devices $CP_{x_1} = CP_{x_q}$, have reached their final values, which are the solutions of the equation system considered.

In the same manner as in the case of these figures the final accuracy depends only on calculator DC.

Of course, many modifications are possible. In particular, Switcher DR may be of any described type.

It should also be noted that many elements have been shown separately in FIG. 15 only for the sake of clarity. Actually, there is preferably only one storing system which is the main memory system of computer DC, such as a magnetic drum, a ferrite system etc.

All the translators $TDA_{ij}$ may be replaced by a single system which operates all the conversions simultaneously to send them into memory devices built into the Switcher DR and which may be of any known type, such as logical circuits, relays etc.

Also converters TAD may be replaced by a single device, which operates step by step and feeds in succession storage devices $CP_{x_1}$ to $CP_{x_q}$ to modify values $x_1$ to $x_q$.

The invention is of course not limited to the embodiments shown which are given only by way of examples.

What is claimed is:

1. An equation computer for solving systems of $p$ nonlinear equations with $q$ unknowns of the type $$f_1(x_1, x_2 \ldots x_q) = 0$$
$$\vdots$$
$$f_p(x_1, x_2 \ldots x_q) = 0$$

said computer comprising: means for providing $q$ magnitudes respectively simulating said unknowns, said means having $q$ respective control inputs and $q$ outputs; a feedback loop between said control inputs and said outputs for adjusting the respective values of said magnitudes to the root values of said equations, said feedback loop comprising: an error calculator, having $q$ inputs respectively coupled to said outputs of said means and $p$ outputs, for calculating said $p$ equation values for the values of said unknowns generated by said means, thus providing $p$ error signals at said $p$ outputs; $p$ sets of $q$ reversible, interconnected quadripoles, said sets being respectively coupled to said $p$ error calculator outputs; said quadripoles having respective primary and secondary terminals, each quadripole of each set having its primary terminals coupled in parallel with the primary terminals of one quadripole of each other set, to one of said control inputs of said means; said quadripoles having respective transfer coefficients equal to $$\frac{\delta f_i}{\delta x_j}$$

$i$ having all the values between 1 and $p$, and $j$ having all the values between 1 and $q$.

2. An equation computer for solving systems of $p$ nonlinear equations with $q$ unknowns of the type $$f_1(x_1, x_2 \ldots x_q) = 0$$
$$\vdots$$
$$f_p(x_1, x_2 \ldots x_q) = 0$$

said computer comprising: $q$ generator means, numbered from 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising: an error calculator having $q$ inputs, numbered from 1 to $q$, respectively coupled to the outputs of said 1 to $q$ generator means, and $p$ outputs, numbered from 1 to $p$, for calculating said $p$ equation values for the values of said unknowns generated by said generators, thus providing $p$ error signals, at said $p$ outputs; $p$ sets, numbered from 1 to $p$, of $q$ reversible interconnected quadripoles, numbered from 1 to $q$; said quadripoles having respective primary and secondary terminals, each quadripole of each set having its primary terminals coupled, in parallel with the primary terminals of the quadripoles of the other sets having the same number, to the control input of the generator having the same number; said sets being respectively coupled to said $p$ error calculator outputs having the same number by said secondary terminals of the quadripoles they comprise; said quadripoles having transfer coefficients equal to $$\frac{\delta f_i}{\delta x_j}$$

$i$ being the respective numbers of the set of quadripoles and $j$ the respective numbers of the quadripoles in each set.

3. An equation computer for solving systems of $p$ nonlinear equations with $q$ unknowns of the type $$f_p(x_1, x_2 \ldots x_q)=0$$
$$\vdots$$
$$f_1(x_1, x_2 \ldots x_q)=0$$

said computer comprising: $q$ generator means, numbered from 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising: an error calculator, having $q$ inputs, numbered from 1 to $q$, respectively coupled to the outputs of said 1 to $q$ generator means, and $p$ outputs, numbered from 1 to $p$, for calculating said $p$ equation values for the values of said unknowns generated by said generators, for providing $p$ error voltages at said $p$ outputs; $p$ sets, numbered from 1 to $p$, of $q$ reversible interconnected voltage to voltage transformers, numbered from 1 to $q$; said transformers having respective primary and secondary terminals, each transformer of each set having its primary terminals coupled, in parallel with the primary terminals of the transformers of the other sets having the same number, to the control input of the generator having the same number; said secondary terminals of the transformers of the same set being respectively connected in series to said output of said error calculator having the same number; said transformers having transfer coefficients equal to $$\frac{\delta f_i}{\delta x_j}$$

$i$ being the respective numbers of the sets of transformers and $j$ the respective numbers of the transformers in each set.

4. An equation computer for solving systems of $p$ nonlinear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means, numbered 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising: an error calculator, having $q$ inputs, numbered from 1 to $q$, respectively coupled to the outputs of said 1 to $q$ generator means, and $p$ outputs, numbered from 1 to $p$, for calculating said $p$ equation values for the values of said unknowns generated by said generators, for providing $p$ error current intensities at said $p$ outputs; $p$ sets, numbered from 1 to $p$, of $q$ reversible interconnected quadripoles, numbered from 1 to $q$; said quadripoles having respective primary and secondary terminals, each quadripole of each set having its primary terminals coupled, in parallel with the primary terminals of the quadripoles of the other sets having the same number, to the control input of the generator having the same number; said secondary terminals of the quadripoles of the same set being respectively connected in parallel to said outputs of said error calculator having the same number; said quadripoles having transfer coefficients equal to $$\frac{\delta f_i}{\delta x_j}$$

$i$ being the respective numbers of the sets of quadripoles and $j$ the respective numbers of the quadripoles in each set.

5. An equation computer for solving systems of $p$ nonlinear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means, numbered from 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising: an error calculator, having $q$ inputs, numbered from 1 to $q$, respectively coupled to the outputs of said 1 to $q$ generator means and $p$ first outputs, numbered from 1 to $p$, for calculating said $p$ equation values for the values of said unknowns generated by said generators, for providing $p$ error signals at said $p$ first outputs and $pq$ second outputs, numbered from 1 to $pq$, for providing $pq$ magnitudes respectively simulating values $$\frac{\delta f_i}{\delta x_j}$$

$p$ sets, numbered from 1 to $p$, of $q$ reversible interconnected quadripoles, numbered from 1 to $q$; said quadripoles having respective primary and secondary terminals, each quadripole of each set having its primary terminals coupled, in parallel with the primary terminals of the quadripoles of the other sets having the same number, to the control input of the generator having the same number; said sets being respectively coupled to said $p$ error calculator outputs having the same number, by said secondary terminals of the quadripoles they comprise; said quadripoles having transfer coefficients respectively controlled by said $pq$ magnitudes $$\frac{\delta f_i}{\delta x_j}$$

$i$ being the respective numbers of the sets of quadripoles and $j$ the respective numbers of the quadripoles in each set.

6. An equation computer for solving systems of $p$ nonlinear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means, numbered 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising: an error calculator, having $q$ inputs, numbered from 1 to $q$, respectively coupled to the outputs of said 1 to $q$ generator means, and $p$ outputs, numbered from 1 to $p$, for calculating said $p$ equation values for the values of said unknowns generated by said generators, for providing $p$ error voltages at said $p$ outputs, and $pq$ output shafts, numbered from 1 to $pq$, for respectively positionally simulating values $$\frac{\delta f_i}{\delta x_j}$$

$p$ sets, numbered from 1 to $p$, of q reversible interconnected voltage to voltage transformers, numbered from 1 to $q$; said transformers having respective primary and secondary terminals, each transformer of each set having its primary terminals coupled, in parallel with the primary terminals of the transformers of the other sets having the same number, to the control input of the generator having the same number, said secondary terminals of the transformers of the same set being respectively connected in series to said outputs of said error calculator having the same number; said transformers having transfer coefficients respectively controlled by said $pq$ shafts and made equal thereby to $$\frac{\delta f_i}{\delta x_j}$$

$i$ being the respective numbers of sets of transformers and $j$ the respective numbers of the transformers in each set.

7. An equation computer for solving systems of $p$ non-linear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means, numbered from 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising an error calculator, having $q$ inputs, numbered from 1 to $q$, respectively coupled to the outputs of said 1 to $q$ generator means, and $p$ outputs numbered from 1 to $p$, for calculating said $p$ equation values for the values of said unknowns genrated by said generators, for providing $p$ error current intensities at said $p$ outputs, and $pq$ second output shafts, numbered from 1 to $pq$, for providing $pq$ magnitudes respectively positionally simulating values $$\frac{\delta f_i}{\delta x_j}$$

$p$ sets, numbered from 1 to $p$, of $q$ reversible interconnected quadripoles, numbered from 1 to $q$; said quadripoles having respective primary and secondary terminals, each quadripole of each set having its primary terminals coupled, in parallel with the primary terminals of the quadripoles of the other sets having the same number, to the control input of the generator having the same number; said secondary terminals of the quadripole of the same set being respectively connected in parallel to said outputs of said error calculator having the same number; said quadripoles having transfer coefficients respectively controlled by said $pq$ shafts and made equal to $$\frac{\delta f_i}{\delta x_j}$$

$i$ being the respective number of sets of transformers and $j$ the respective numbers of the transformers in each set.

8. An equation computer for solving systems of $p$ non-linear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means, numbered from 1 to $q$ for generating magnitudes respectively simulating said unknowns, said generator means having respective control inputs and outputs; a feedback loop between said control inputs and said outputs for adjusting the respective values of said magnitudes to the root values of said equations, said feedback loop comprising an error calculator, having $q$ inputs, numbered from 1 to $q$, respectively coupled to the outputs of said 1 to $q$ generator means, and $p$ outputs numbered from 1 to $p$, for calculating said $p$ equation values for the values of said unknowns generated by said generators, for providing $p$ error voltages at said $p$ outputs, and $pq$ output shafts, numbered from 1 to $pq$, for respectively positionally simulating values $$\frac{\delta f_i}{\delta x_j}$$

$p$ sets, numbered from 1 to $p$, of $q$ reversible interconnected voltage to voltage transformers numbered from 1 to $q$; said transformers having respective primary and secondary terminals, each transformer of each set having its primary terminals coupled, in parallel with the primary terminals of the transformers of the other sets having the same number, to the control input of the generator having the same number; said secondary terminals of the transformers of the same set being respectively connected in series to said outputs of said error calculator having the same number; said transformers having transfer coefficients respectively controlled by said $pq$ shafts and made equal to $$\frac{\delta f_i}{\delta x_j}$$

$i$ being the respective numbers of sets of transformers and $j$ the respective numbers of the transformers in each set; each transformer comprising a quadripole having first and second outer and intermediate pairs of terminals, a first, a second and third reactance respectively connecting said terminals pairs of variable reactances of opposite sign connecting said first terminals to each of said intermediate terminals, the sum of the reactances of one pair being equal to that of the other pair and the sum of the reactances of each pair being contant; further reactances of opposite sign respectively connecting said intermediate terminals to said third terminals, said quadripole being resonant for the operating frequency with one pair of said outer terminals shorted, said outer terminals being connected respectively to said primary and secondary terminals; and means connected to said output shaft for varying said variable reactances.

9. An equation computer for solving systems of $p$ non-linear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means, numbered from 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising: an error calculator having $q$ inputs, numbered from 1 to $q$, respectively coupled to the outputs of said 1 to $q$ generator mean, and $p$ first outputs numbered from 1 to $p$, for calculating said $p$ equation values for the values of said unknowns generated by said generators, for providing $p$ error signals in the shape of current intensities, at said $p$ first outputs; and $pq$ second outputs, numbered from 1 to $pq$, for providing $pq$ magnitudes respectively simulating values $$\frac{\delta f_i}{\delta x_j}$$

$p$ sets, numbered from 1 to $p$, of $q$ reversible interconnected quadripoles, numbered from 1 to $q$; said quadripoles having respectively primary and secondary terminals, each quadripole of each set having its primary terminals coupled, in parallel with the primary terminals of the quadripoles of the other sets having the same number, to the control input of the generator having the same number; the secondary terminals of the quadripoles of each set being coupled in parallel; to said error calculator outputs having the same number by said secondary terminals of the quadripoles they comprise; said quadripoles having transfer coefficients respectively controlled by said *pq* magnitudes $$\frac{\delta f_i}{\delta x_j}$$

*i* being the respective numbers of the sets of quadripoles and *j* the respective numbers of the quadripoles in each set, said quadripoles comprising a first and a second reactance of a first sign respectively connecting said primary terminals and secondary terminals; two pairs of variable reactances of a sign opposite to said first sign, connecting each of said primary terminals to said secondary terminals; means connected to said *pq* outputs for varying said reactances, the sum of reactances in each pair remaining constant and the reactances of each pair being respectively equal to the reactances of the other, the sum of the reactances in each quadripole being nil, when one pair of terminals is shorted.

10. An equation computer for solving systems of *p* nonlinear equations with *q* unknowns of the type $$f_1(x_1, x_2 \ldots x_q)=0$$
$$\vdots$$
$$f_p(x_1, x_2 \ldots x_q)=0$$

said computer comprising: first means for providing *q* magnitudes respectively simulating said unknowns, said means having *q* respective control inputs and output means for providing *q* output magnitudes; a feedback loop between said control inputs and said output means for adjusting the respective values of said magnitudes to the root values of said equations, said feedback loop comprising: a calculator having input means for collecting said *q* output magnitudes, means for calculating said *p* equation values for the values of said unknowns generated by said first means and *p* outputs, thus providing *p* respective signals at said *p* outputs; a switcher circuit having *q* inputs respectively designated by a number *j*, *j* having all the values between 1 and *q*, and *p* outputs respectively designated by a number *i*, *i* having all the values between 1 and *p*; transformer paths coupling each one of said *q* switcher inputs to each one of said *p* switcher outputs; said paths being reversible and their respective transfer coefficients being equal to $$\frac{\delta f_i}{\delta x_j}$$

and said *q* inputs being respectively coupled to said *q* control inputs and said *p* outputs being respectively coupled to said *p* outputs of said calculator.

11. An equation computer for solving systems of *p* nonlinear equations with *q* unknowns of the type $$f_1(x_1, x_2 \ldots x_q)=0$$
$$\vdots$$
$$f_p(x_1, x_2 \ldots x_q)=0$$

said computer comprising: first means for providing *q* magnitudes respectively simulating said unknowns, said means having *q* respective control inputs, and output means for providing *q* output magnitudes; a feedback loop between said control inputs and said output means for adjusting the respective values of said magnitudes to the root values of said equations, said feedback loop comprising: a calculator, having input means for collecting said *q* output magnitudes, means for calculating said *p* equation values for the values of said unknowns generated by said first means and *p* outputs, thus providing *p* respective signals at said *p* outputs, a switcher circuit having *q* inputs respectively designated by a number *j*, *j* having all the values between 1 and *q*, and *p* outputs respectively designated by a number *i*, *i* having all the values between 1 and *p* transformer paths coupling each one of said *q* switcher inputs to each one of said *p* switcher output; said paths being reversible and providing at each of said *p* outputs electrical magnitudes equal to $$\frac{\delta f_i}{\delta x_j}$$

upon application of an electrical magnitude taken as unity to each of said *q* inputs, and said *q* inputs being respectively coupled to said *q* control inputs and said *p* outputs being respectively coupled to said *p* outputs of said calculator.

12. An equation computer for solving systems of *p* nonlinear equations with *q* unknowns of the type $$f_1(x_1, x_2 \ldots x_q)=0$$
$$\vdots$$
$$f_p(x_1, x_2 \ldots x_q)=0$$

said computer comprising: *q* generator means, numbered from 1 to *q*, for generating magnitudes respectively simulating said unknowns, said generator means having respective control inputs and outputs; a feedback loop between said control inputs and said outputs for adjusting the respective values of said magnitudes to the root values of said equations, said feedback loop comprising an error calculator, having *q* inputs, numbered from 1 to *q*, respectively coupled to the outputs of said 1 to *q* generator means, and *p* outputs, numbered from 1 to *p*, for calculating said *p* equation values for the values of said unknowns generated by said generators, thus providing *p* error signals, at said *p* outputs; a switcher circuit having *q* inputs, numbered from 1 to *q*, and *p* outputs numbered from 1 to *p*; transformer paths respectively coupling each one of said *q* switcher inputs to each one of said *p* switcher outputs, said paths being reversible and their respective transfer coefficients being equal to $$\frac{\delta f_i}{\delta x_j}$$

*i* having all the values between 1 and *p*, and *j* having all the values between 1 and *q*, said *q* switcher inputs being respectively coupled to said *q* control inputs having the same number and said *p* switcher outputs being respectively coupled to said *p* error calculator outputs having the same number.

13. An equation computer for solving systems of *p* nonlinear equations with *q* unknowns of the type $$f_1(x_1, x_2 \ldots x_q)=0$$
$$\vdots$$
$$f_p(x_1, x_2 \ldots x_q)=0$$

and computer comprising: *q* generator means numbered from 1 to *q* for generating magnitudes respectively simulating said unknowns, said generator means having respective control inputs and outputs; a feedback loop between said control inputs and said outputs for adjusting the respective values of said magnitudes to the root values of said equations, said feedback loop comprising an error calculator, having *q* inputs, numbered from 1 to $q$, respectively coupled to the outputs of said 1 to $q$ generator means, and $p$ outputs, numbered from 1 to $p$, for calculating said $p$ equation values for the values of said unknowns generated by said generators, for providing $p$ error voltages, at said $p$ outputs; a switcher circuit having $q$ inputs, numbered from 1 to $q$ and $p$ outputs, numbered from 1 to $p$; voltage to voltage transformer paths, coupling each one of said $q$ switcher inputs to each one of said $p$ switcher outputs, said paths, being reversible and their respective transfer coefficients being equal to $$\frac{\delta f_i}{\delta x_j}$$

$i$ having all the values between 1 and $q$, and j having all the values between - and $q$, said $q$ switcher inputs being respectively coupled to said $q$ control inputs having the same number, and said $p$ switcher outputs being respectively coupled to said $p$ error calculator outputs having the same number.

14. An equation computer for solving systems of $p$ nonlinear equations with $q$ unknowns of the type $$f_1(x_1, x_2 \ldots x_q)=0$$
$$\vdots$$
$$f_p(x_1, x_2 \ldots x_q)=0$$

said computer comprising: $q$ generator means numbered from 1 to $q$, for generating magnitudes respectively simulating said unknowns, said generator means having respective control inputs and outputs; a feedback loop between said control inputs and said outputs for adjusting the respective values of said magnitudes to the root values of said equations, said feedback loop comprising an error calculator, having $q$ inputs, numbered from 1 to $q$, respectively coupled to the outputs of said 1 to $q$ generator means, and $p$ outputs, numbered from 1 to $p$, for calculating said $p$ equation values for the values of said unknowns generated by said generators, for providing $p$ error current intensities, at said $p$ outputs; a switcher circuit having $q$ inputs numbered from 1 to $q$, and $p$ outputs numbered from 1 to $p$; current to voltage transformer paths, coupling respectively each one of said $q$ switcher inputs to each one of said $p$ switcher outputs, said paths being reversible and their transfer coefficients being equal to $$\frac{\delta f_i}{\delta x_j}$$

$i$ having all the values between 1 and $q$, and $j$ having all the values between 1 and $q$, said $q$ wsitcher inputs being respectively coupled to said $q$ control inputs having the same number and said $p$ switcher outputs being respectively coupled to said $p$ error calculator outputs having the same number.

15. An equation computer for solving systems of $p$ nonlinear equations with $q$ unknowns of the type $$f_1(x_1, x_2 \ldots x_q)=0$$
$$\vdots$$
$$f_p(x_1, x_2 \ldots x_q)=0$$

said computer comprising: digital memory device for providing $q$ digits $x_1^0$ to $x_q^0$ and having an input and an output; analog-to-digital converters, numbered from 1 to $q$, connected to said input; a digital computer connected to said output for computing successively the respective values of said equations $f_1$ to $f_p$, for $x_1=x_1^0 \ldots x_p=x_p^0$, and values $$\frac{\delta f_i}{\delta x_j}$$

$i$ having all the values between 1 and $p$, and j having all the values between 1 and $q$; $p$ first memory devices, numbered from 1 to $p$; for storing said values $f_1$ to $f_p$; $pq$ second memory devices for storing respectively said values $$\frac{\delta f_i}{\delta x_j}$$

a feedback loop comprising: $p$ first digital-to-analog converters numbered from 1 to $p$ and respectively connected to said $p$ first memory devices for providing $p$ error signals; $pq$ second digital-to-analog converters connected respectively to said second $pq$ memory devices; $p$ sets, numbered from 1 to $p$, of $q$ reversible quadripoles, numbered from 1 to $q$; said quadripoles having respectively primary and secondary pairs of terminals; each quadripole of each set having its primary terminals coupled, in parallel with the primary terminals of the quadripoles of the other sets having the same number, to said analog-to-digital converter having the same number, for respectively providing digits $U_1$ to $U_q$; said secondary terminals of said quadripoles being connected to said first digital-to-analog converters; said quadripoles having respective transfer coefficients respectively controlled by $pq$ second memory devices.

References Cited by the Examiner

UNITED STATES PATENTS

| | | | |
|---|---|---|---|
| 2,476,747 | 7/49 | Lovell | 235—180 |
| 2,613,032 | 10/52 | Serrell et al. | 235—180 |
| 2,785,853 | 3/57 | Honore et al. | 235—193 |
| 2,805,823 | 9/57 | Raymond et al. | 235—180 |

OTHER REFERENCES

Sarbacher: Encyclopedic Dictionary of Electronics and Nuclear Engineering, Prentice-Hall, 1950, pages 828 and 1350.

MALCOLM A. MORRISON, *Primary Examiner.*

WALTER W. BURNS, Jr, *Examiner.*